United States Patent
Jain et al.

(10) Patent No.: US 10,904,244 B2
(45) Date of Patent: Jan. 26, 2021

(54) PROGRESSIVE ACCESS TO DATA AND DEVICE FUNCTIONALITY

(71) Applicant: Microsoft Technology Licensing, LLC, Redmond, WA (US)

(72) Inventors: Raju Jain, Kirkland, WA (US); Craig Thomas McIntyre, Kirkland, WA (US); Kiran Kumar, Redmond, WA (US); Peter Gregory Davis, Kirkland, WA (US); Jeff Johnson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 16/156,588

(22) Filed: Oct. 10, 2018

(65) Prior Publication Data
US 2020/0120088 A1 Apr. 16, 2020

(51) Int. Cl.
*H04L 29/06* (2006.01)
*G06F 21/62* (2013.01)

(52) U.S. Cl.
CPC ...... *H04L 63/0853* (2013.01); *G06F 21/6245* (2013.01); *H04L 63/105* (2013.01)

(58) Field of Classification Search
CPC combination set(s) only.
See application file for complete search history.

(56) References Cited

U.S. PATENT DOCUMENTS

2009/0094681 A1 4/2009 Sadler et al.
2014/0165152 A1* 6/2014 Farouki ............... H04L 63/08
726/4
(Continued)

FOREIGN PATENT DOCUMENTS

EP 2869528 A1 5/2015
WO 2017031504 A1 2/2017
(Continued)

OTHER PUBLICATIONS

"International Search Report and Written Opinion Issued in PCT Application No. PCT/US19/052528", dated Nov. 12, 2019, 12 Pages.
(Continued)

*Primary Examiner* — Kevin Bechtel
(74) *Attorney, Agent, or Firm* — Newport IP, LLC; Benjamin Keim

(57) ABSTRACT

A communal computing device such as an interactive digital whiteboard can provide progressively more access to functionality and data on the device based on a level of certainty in the identity of a user. If a user is identified based on one or more low-fidelity identification signals such as an image of the user or a device identifier, the communal computing device may provide a first level of functionality that is limited. If the user requests greater access, the communal computing device can request that a trusted cloud-based provider authenticate the user by way of a personal device, such as a smartphone. The authentication may be a password or high-fidelity biometric identification. The cloud-based provider communicates successful authentication to the communal computing device and it, in turn, provides the user access to higher, second level of functionality.

20 Claims, 11 Drawing Sheets

(56) References Cited

U.S. PATENT DOCUMENTS

| | | | |
|---|---|---|---|
| 2014/0370879 A1* | 12/2014 | Redding | H04M 3/42178 |
| | | | 455/419 |
| 2015/0161370 A1 | 6/2015 | North et al. | |
| 2016/0057124 A1 | 2/2016 | Boyle et al. | |
| 2016/0205094 A1 | 7/2016 | Harthattu et al. | |
| 2017/0195307 A1* | 7/2017 | Jones-McFadden | ........................ |
| | | | H04W 12/06 |
| 2017/0374070 A1* | 12/2017 | Shah | H04L 63/105 |
| 2018/0007060 A1 | 1/2018 | Leblang et al. | |
| 2018/0084428 A1 | 3/2018 | Boyle et al. | |
| 2020/0117779 A1 | 4/2020 | Jain et al. | |
| 2020/0120094 A1 | 4/2020 | Jain et al. | |

FOREIGN PATENT DOCUMENTS

| | | |
|---|---|---|
| WO | 2018004935 A1 | 1/2018 |
| WO | 2018126177 A1 | 7/2018 |

OTHER PUBLICATIONS

"International Search Report and Written Opinion Issued in PCT Patent Application No. PCT/US19/052529", dated Nov. 13, 2019, 14 Pages.

"International Search Report and Written Opinion Issued in PCT Patent Application No. PCT/US19/053328", dated Nov. 15, 2019, 15 Pages.

* cited by examiner

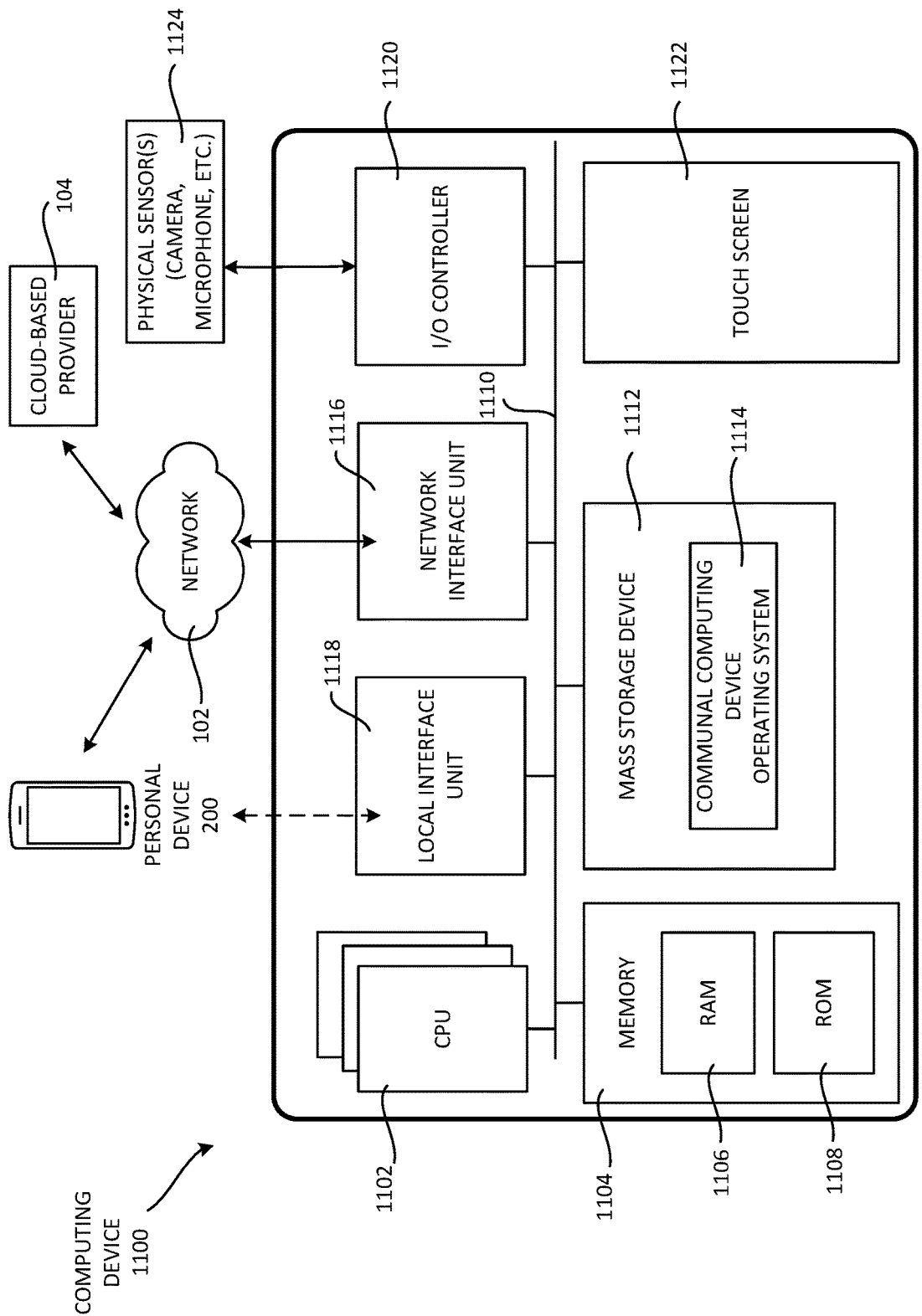

PROGRESSIVE ACCESS TO DATA AND DEVICE FUNCTIONALITY

BACKGROUND

User authentication on devices that are shared with many others (communal computing devices), like an interactive digital whiteboard, a smart television, or a public kiosk, presents a complex set of user concerns. These types of devices are used by multiple users and each user may wish to access personalized content or his or her own files. Logging in using a password is one way for a user to be recognized by a device and gain access to personal documents and other content.

However, passwords can be insecure and can be cumbersome for users to enter on communal computing devices without a physical keyboard. It might also be insecure and awkward for users to enter passwords when in front of other users, such as on a large screen communal device or a communal computing device in a public location. Typing in a password on a communal computing device may present a security risk which could be mitigated by another technique for the device to recognize a user.

Biometric security, such as face recognition, can provide a more secure and convenient way to authenticate users on communal computing devices. Biometric security, however, typically requires specialized hardware and per-device enrollment (e.g. fingerprint, face, or voice enrollment). Per-device enrollment may be impractical when the user wishes to use a communal computing device quickly and may not use that device again. Due to security concerns, biometric data is typically stored on the device where the biometrics are captured rather than on a remote location accessed via a network such as cloud storage. However, due to the shared nature of communal computing devices, there are security concerns related to storing biometric data on a communal computing device.

Consequently, current log-in or authentication techniques when used on communal computing devices are either insecure or require additional processor usage and specialized hardware to enroll biometric data. It is with respect to these and other technical challenges that the disclosure made herein is presented.

SUMMARY

A trust relationship is established between a communal computing device, such as an interactive digital whiteboard, and a trusted cloud-based provider such as a centrally-managed identity service. The cloud-based provider is implemented by a collection of networks, networking devices, protocols, etc. that enable computing devices to access services provided by network-accessible computing systems from any location that has access to the networks. A trust relationship is also established between a user's personal device, such as a smartphone, and the cloud-based provider. For instance, in an enterprise environment, a user's personal device may be registered on the same corporate network as the communal computing device in order to establish the trusted relationship.

By leveraging the user's existing personal device as a tool for authenticating on a communal computing device, security is improved relative to existing techniques and processor usage for implementing log-in and biometric enrollment is reduced. The personal device can serve as a second factor for authentication in addition to user interactions with the communal computing device. Any interactions that may raise security concerns if performed in front of a group on a communal computing device can instead be performed privately on the user's personal device. If biometrics are used, the enrollment may be done once on the personal device, saved locally on the personal device, but used to unlock additional functionally and data on any communal computing device that operates according to the technology described in this disclosure.

As part of the personal device registration process, a user might be asked to provide "low-fidelity" identification data, such as a self-snapshot or a recording of the user speaking. The low-fidelity identification data may be stored by the cloud-based provider. Other types of non-personal information can also be stored, such as a hardware identifier (ID) for the user's personal device. There are no security concerns for storing low-fidelity identification data because this type of data does not impact user privacy and by itself cannot be used to access private data or secure information.

When the user later comes into proximity to the communal computing device, the communal computing device can use the low-fidelity identification data to recognize the user. For example, a camera on the communal computing device might capture an image of the user or a microphone on the communal computing device might capture audio of the user speaking. Additionally, the communal computing device might detect the hardware ID for the user's personal device via short-range wireless communication using radio waves such as the BLUETOOTH communications protocol or other protocol. The communal computing device can then communicate with the cloud-based provider to determine if a match is found with the user's previously-stored identification data (e.g. the previously stored self-snapshot or device hardware ID). In an implementation, the communal computing device can use multiple "weak" signals to identify a user. Other examples of "weak" signals that may be sufficient for identification but not sufficient to authenticate a user include calendar appointments and location of a device associated with the user.

Once any user is detected, the user may be able to manipulate content that is already available on the communal computing device such as an open presentation document (e.g., a POWERPOINT file or similar) or access shared content that is widely available (e.g., a scheduling calendar for the room in which the communal computing device is located). This may be considered the lowest level of access provided to most users simply upon being recognized as a user.

If a match is found, the communal computing device considers the user to have been "identified" and can provide a first level of functionality commensurate with the amount of trust placed in an "identified" but un-authenticated user. For example, the communal computing device might provide a first level of functionality which allows the user to use a whiteboard program or use the microphone of the communal computing device to transmit a recording of a meeting. The communal computing device might also configure itself according to the user's preferences (e.g. language, display settings, right-handed/left-handed use, etc.).

The identified user may also be identified as a member of a group that has access to content associated with the group such as the contents of a shared folder. Identifying the user as part of a group may be based on a higher confidence in the identification. For example, additional weak signals such as the presence of another member of the same group may be required before an identified user is identified as a group member. The user, once identified as a member of the group, can then access and interact with content associated with the group. However, the access may be limited, such as by preventing editing of the content, because the user is not yet identified.

If the user subsequently requests to access functionality of the communal computing device that is not available to identified but un-authenticated users (e.g. accessing private data of the user or running the user's own programs or editing a shared document), the communal computing device can send a request for authentication to the cloud-based provider. In turn, the cloud-based provider can send a request for authentication to the user's personal device. If the user is able to authenticate on the personal device (e.g. provide a personal identification number (PIN), password, fingerprint, etc.), then the cloud-based provider informs the communal computing device indicating that the user has been authenticated. The communal computing device can then permit the user to access a second level of functionality based on the authentication.

This second level of functionality can include, for example, accessing personal data, sending emails from the user's account, loading software programs belonging to the user, editing files that are shared with other users, etc. For example, once a user is identified as a member of a group and granted read-only access to documents of the group, attempting to edit or save a group document may trigger the communal computing device to attempt to authenticate the user before providing full access to modify and save group documents.

This technology is not limited to just two levels of functionality but may provide a continuum of different levels based on the amount of trust placed in the identification and/or authentication signals for a user. For example, users who are not identified may receive a "guest" level of access, identified users may be divided into low-confidence identification and high-confidence identification groups, and authenticated users may be divided into one-factor authenticated users and multi-factor authenticated users resulting in five different levels of progressively greater trust and corresponding access.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 11 is a computer architecture diagram and network diagram showing an illustrative computer hardware and software architecture for the communal computing device.

DETAILED DESCRIPTION

Figure 1:
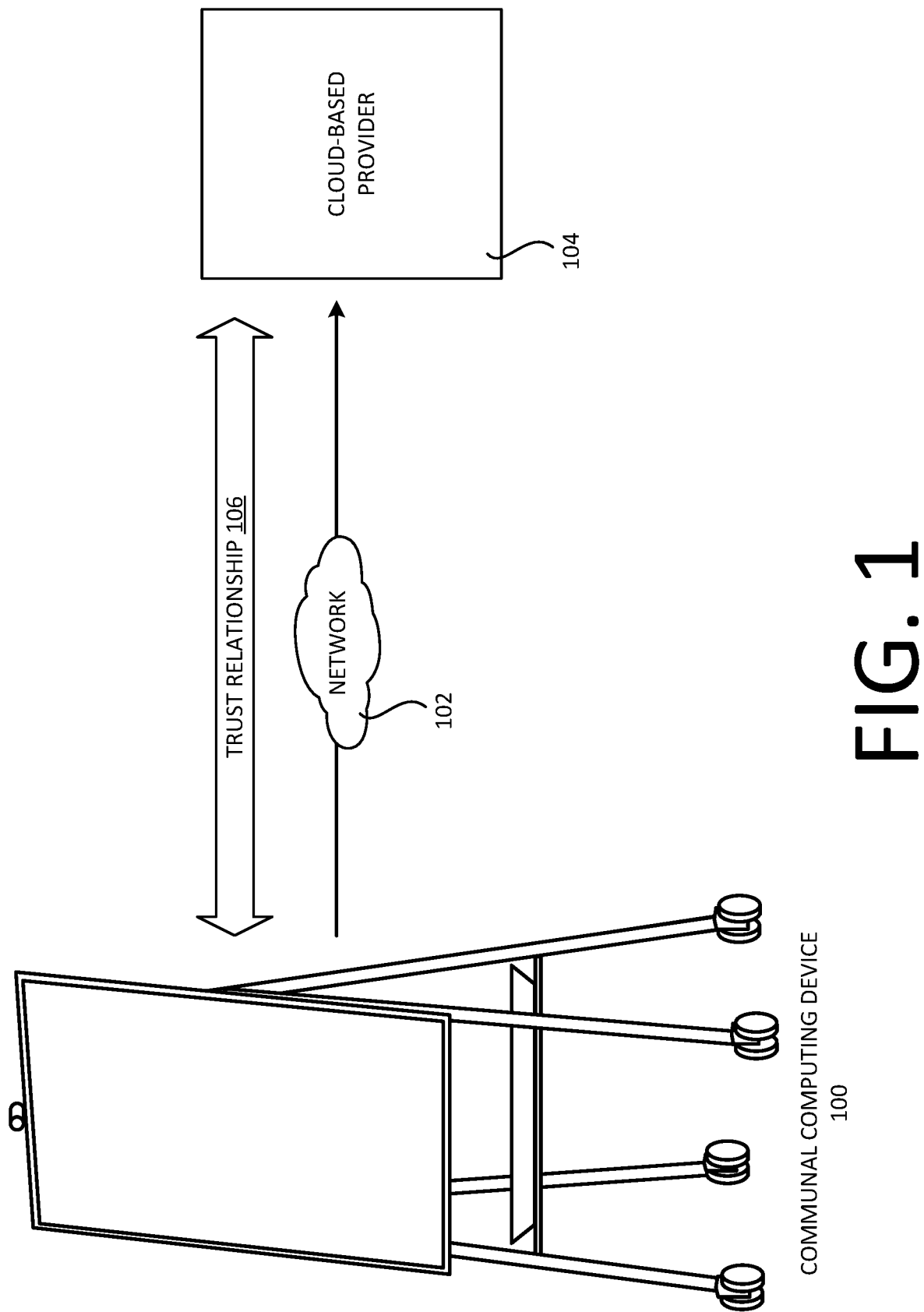
FIG. 1 is a diagram illustrating a trust relationship between a communal computing device and a cloud-based provider.

The following detailed description is directed to technologies for accessing progressively higher levels of functionality and personal data on a communal computing device based upon the strength of detected identity signals. These techniques provide greater security because a user's personal device can be used both to log-in and to store sensitive authentication data such as biometric enrollment data. Additionally, processor usage is reduced because existing passwords, biometric logins, and other authentication techniques that are already implemented on a user's personal device do not need to be repeated on the communal computing device. As will be described in greater detail below, a communal computing device has an established trust relationship with a trusted, cloud-based provider that controls trusted relationships. A personal device associated with the user such as a smartphone can also have a trust relationship with the same cloud-based provider.

As part of an enrollment process, a user provides low-fidelity identification data or non-personal identification data. For example, the user may provide a standard photograph of his or her face using a visible-light camera (e.g., a self-snapshot) or a recording of the user speaking. As a further example, the user could provide a hardware ID such as a hardware serial number of a smartphone or an ID number from a radio-frequency identification (RFID) card such as an employee badge. These types of low-fidelity identification data make it possible to identify a user but are not secure enough to authenticate the user in the same way as a password or high-fidelity biometric data. The low-fidelity identification data can be stored by the cloud-based provider in a network-accessible location without the security concerns associated with storing passwords or high-fidelity identification data on a network location.

When the user later comes into proximity to the communal computing device, the communal computing device can utilize the identification data to identify the user. For example, the communal computing device might take an RGB (red, green, blue color model) photo of the user and/or detect the hardware ID of the user's personal device. The communal computing device can then communicate with the cloud-based provider to determine if a match is found with the user's low-fidelity identification data (e.g. the previously stored photo or device hardware ID). To improve the speed of identification and to reduce the possibility of an incorrect match, the matching may be performed against a limited set of identities known to the cloud-based provider. Use of a limited search scope to identify a user is discussed in U.S. Patent Application entitled "Authenticating Users Of Communal Computing Devices Using A Limited Search Scope" filed on the same day as this application.

To provide greater security and decrease the chance of misidentifying users, two or more low-fidelity identification signals may be required before a user is identified. For example, a user may be identified if a camera detects the face of the user in the proximity of the communal computing device and the hardware ID of the user's smartphone is also detected. Other "weak" signals include calendar appointments and the reported location of a device associated with the user such as a smartphone. Thus, identification of a user can be made passively without any direct interaction between the user and the communal computing device.

Users may be asked to opt-in to the passive identification functionality. Thus, without explicit user consent, the user will not be collected and/or identified by a communal computing device.

Once the user is identified, the communal computing device can provide access to limited functionality and data. For example, this first level of access might include access to public data (e.g., weather forecasts) or data that is shared with other users that are also proximate to the communal computing device (e.g. other users in the same conference room) such as a calendar item. The access may include basic programs on the communal computing device such as a web browser or a whiteboard application.

If the user requests access to data or functionality that exceeds what is provided by the first level of access, the communal computing device can send a request for authentication to the cloud-based provider. In turn, the cloud-based provider can send a request for authentication to the user's personal device. If the user successfully authenticates on their personal device (e.g. provides a PIN, password, fingerprint, etc.), a signal is sent through the cloud-based provider to the communal computing device indicating that the user has been authenticated. The existing trust relationships between the personal device and the cloud-based provider as well as between the cloud-based provider and the communal computing device allow the authentication on the personal device to be trusted by the communal computing device. The communal computing device can then provide the user a second level of functionality that includes access to personal data, a greater range of applications, and the like.

It is to be appreciated that the disclosed technologies are not limited to providing two levels of access to data and device functionality. Rather, the amount of personal data available on the communal computing device and the types of functionalities unlocked can be progressively varied according to the number and trustworthiness of the identity signals for the user that are accumulated by the communal computing device. For example, the communal computing device may provide progressive levels of access based on the strength of the signal used to authenticate the user. For example, authentication using a PIN may provide less access than authentication using a password which in turn may provide less access than authentication using secure biometrics such as a fingerprint reader on the personal device.

This technology is also not limited to use with a communal computing device such as an interactive digital whiteboard. For instance, a first user might be working at a laptop or desktop computer that is not used as a communal computing device. However, if a second user comes by the first user's desk, the second user may be identified but not authenticated by the first user's computer in the manner described above. The first user's computer can then modify the user interface to indicate that the second user has been identified. The first user can select this identification to see, for example, public information or documents the two users were working on together (i.e., the documents that both users have accessed, edited, authored, etc.). The second user can use a personal device such as a smartphone to sign in on the first user's computer in the manner described above to access his or her private data. The second user can be automatically signed out when she walks away from the first' user computer.

The disclosed technologies are also applicable in the home context. For example, a user can be identified but not authenticated using the mechanism described above when she walks into her house. Once identified, a smart home ecosystem can provide non-personal data or perform certain tasks for the user (e.g. automatically tune music to her liking, set the temperature, turn on the lights, etc.). A personal digital assistant on one of the user's devices might then inform the user that personal information is available, such as email messages. When the user asks to access the personal information, the smart home ecosystem will ask the user to authenticate on her personal device. Authentication on the personal device may be confirmed by a trusted cloud-based identity service in the manner described above. Additional details will be provided below regarding the technologies described briefly above for providing progressive levels of access on a communal computing device.

As discussed briefly above, the disclosed technologies can provide limited access to identified but non-authenticated users in a way that reduces the steps needed to be performed by the users, thereby improving the user experience and providing greater convenience. Sharing trust relationships with a cloud-based service provides a way to securely authenticate on a first device, e.g. a smartphone, that is recognized by a second device such as an interactive digital whiteboard. Thus, use of the personal device as part of the authentication process increases system and data security because of the shared trust relationships and because the user is not asked to provide secure credentials such as a password to a computing device used by many other individuals or in the presence of other individuals. As a result, implementations of the disclosed technologies can improve human-machine interface activities and increase security as compared to previous technologies for accessing communal computing devices. Other technical benefits not specifically mentioned herein can also be realized through implementations of the disclosed subject matter.

FIG. 1 is a diagram illustrating a communal computing device 100 that communicates over a network 102 with a cloud-based provider 104 and has a trust relationship 106. The communal computing device 100 may be any type of computing device that is used simultaneously by multiple users or use by different users at different times. Examples of communal computing devices 100 include interactive digital whiteboards, smart televisions, computer systems in vehicles such as automobiles, computers at public locations such as libraries, computers that are borrowed for limited times such as at a school or business setting, computers at a location that are shared by multiple users such as a reception desk, etc. Interactive digital whiteboards include, for example, the SURFACE HUB and SURFACE HUB 2 by MICROSOFT CORPORATION.

The network 102 may be any type of communications network such as the Internet, a local area network, a wide area network, a peer-to-peer network, and may be implemented by any type of networking technology including wireless and wired networking technologies. The network 102 provides a communication path or data between the communal computing device 100 and the cloud-based provider 104.

The cloud-based provider 104 is a source of trusted identities for devices and users. The cloud-based provider 104 is one or more server computers or other physical or logical computing devices that are located at one or more physical locations. The cloud-based provider 104 may be implemented with redundant infrastructures so that if any server or other piece of hardware or equipment becomes non-functional, the role of that non-functional device is provided by a different device. The cloud-based provider provides services over "the cloud" which is via a network connection to the device(s) receiving the services. A trusted relationship between a device and the cloud-based provider 104 might be established if the cloud-based provider 104 can communicate securely with the device, for example, through the use of public/private key cryptography The existence of a trust relationship allows a computing device to rely on user identification and authentication determinations made by another computing device with which it shares the trust relationship.

The cloud-based provider 104 may be located remote from the communal computing device 100 so that it is isolated from physical security threats to the communal computing device 100. For example, the cloud-based provider 104 may be implemented as one or more network-accessible servers that can be accessed from any location connected to the network 102. One example of a cloud-based provider that manages trust relationships is the AZURE IDENTITY network service by MICROSOFT CORPORATION.

Figure 2:
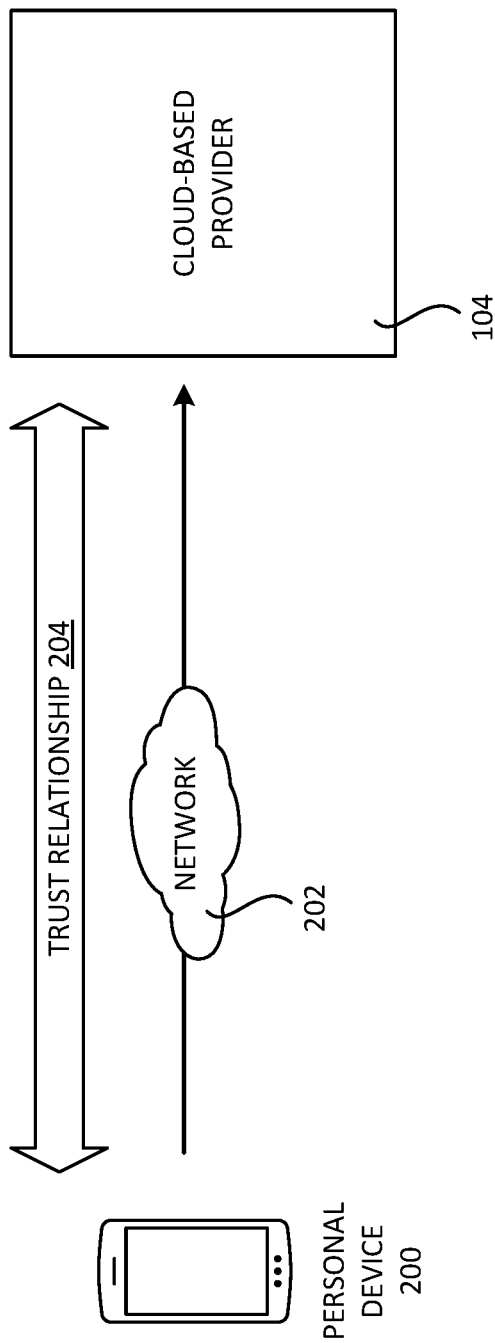
FIG. 2 is a diagram illustrating a trust relationship between a personal device and the cloud-based provider.

FIG. 2 is a diagram illustrating a personal device 200 that communicates via a network 202 to and has a trust relationship 204 with the cloud-based provider 104. The personal device 200 is a device that is associated with and typically used only by a single user. Examples of personal devices 200 include smartphones, personal digital assistants, media players, tablet computers, and the like. Personal devices 200 may be implemented in any number of different form factors such as portable devices, wearable devices, implantable devices, etc. Personal devices 200 typically include at least basic computing capability and are equipped with one or more processors, one or more types of memory, and input/output devices as well as network hardware.

The trust relationship 204 can be a pre-established trust relationship based on enrollment or registration of the personal device 200 with the cloud-based provider 104. Enrollment may include creating a biometric login to the personal device 200 such as by setting up a fingerprint reader or other sensor capable of capturing biometric information. The biometric data can be securely stored under the user's control on his or her personal device 200. Additionally, once the hardware on the personal device 200 is set up to accurately recognize the user's biometrics, the recognition by the personal device 200 may be used to access not only the personal device 200 but also the communal computing device 100 and other devices.

Registration may include communicating information about the personal device 200 to the cloud-based provider 104 such as a unique device identifier. The unique device identifier may be, for example, a hardware ID, a serial number, a phone number, etc. The pre-established trust relationship may be implemented by establishing a secure communication channel between the personal device 200 and the cloud-based provider 104 such as through use of public/private key encryption. Additionally, installation of a software token recognized by the cloud-based provider 104 on the personal device 200 may be part of creating the pre-established trust relationship.

The network 202 provides a commutative connection between the personal device 200 and the cloud-based provider 104. The network 202 may be implemented as any type of network such as the Internet, a cellular network, a wired telephone network, a peer-to-peer network, etc. The personal device 200 may have a wireless connection with the network 202 such as a connection communications protocol that uses radio frequencies such as wireless fidelity (WI-FI), BLUETOOTH, or another wireless communication technology. The network 202 may be the same or different than the network 102 introduce FIG. 1.

The cloud-based provider 104 may be the same as the cloud-based provider 104 introduced in FIG. 1. However, the communal computing device 100 and the personal device 200 may access different hardware or different physical servers that are both part of the same cloud-based provider 104. Thus, even if the communal computing device 100 and the personal device 200 cannot directly communicate with each other because they use different networks, both are able to communicate with the cloud-based provider 104. The trust relationship 204 between the personal device 200 and the cloud-based provider 104 allows the cloud-based provider 104 to recognize the personal device 200 based on a characteristic of the personal device 200 such as a hardware ID and/or based on an identity of a user associated with the personal device 200.

Figure 3:
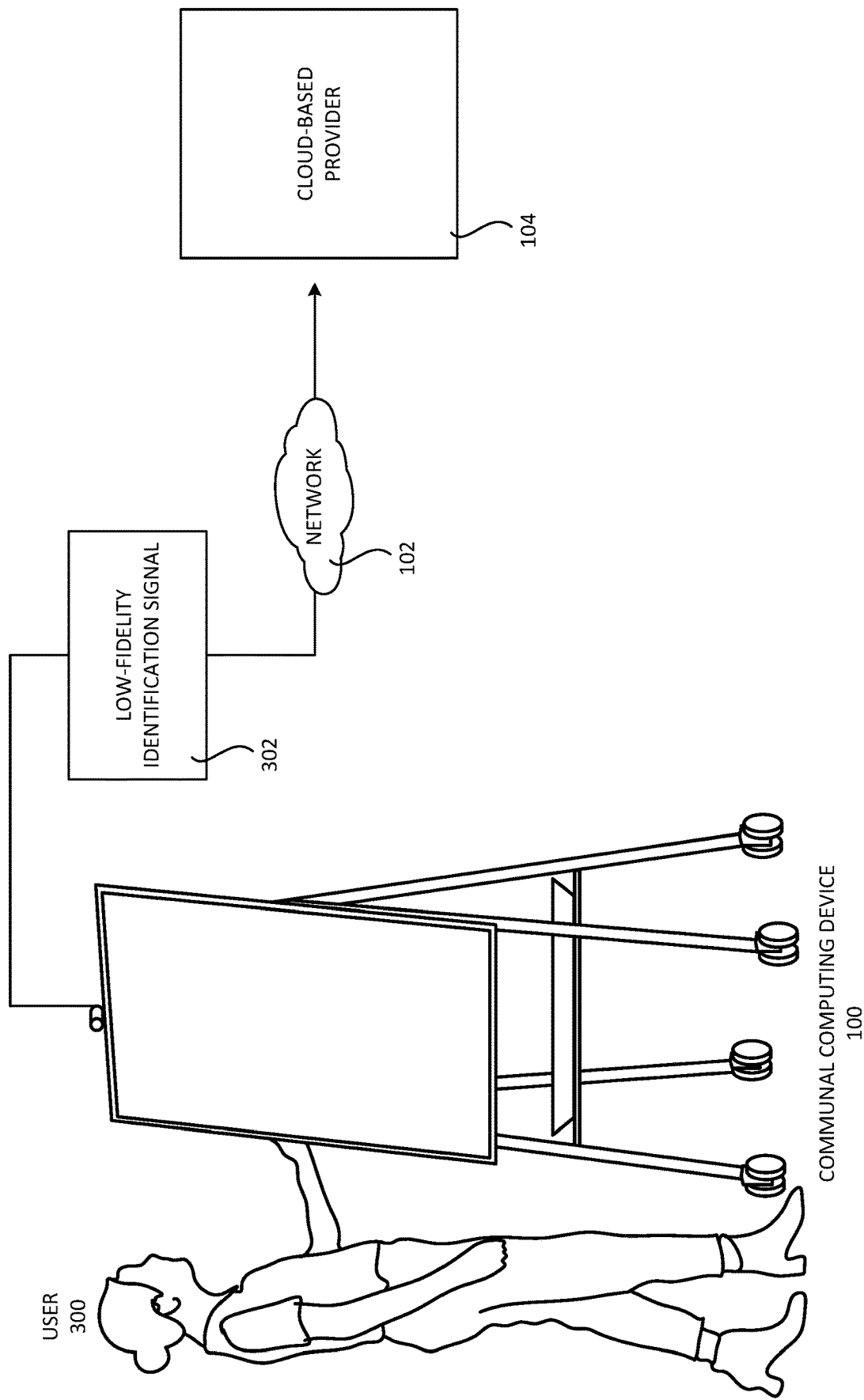
FIG. 3 is a diagram showing transmission of a low-fidelity identification signal from the communal computing device to the cloud-based provider.

FIG. 3 is a diagram illustrating a user 300 in proximity to the communal computing device 100. The user 300 may be detected in the proximity of the communal computing device 100 by a sensor on the communal computing device 100 such as a camera or microphone. The user 300 may be determined to be "proximate" to the communal computing device 100 when the user 300 is within a threshold distance such as one meter, two meters, three meters etc. Proximity may also be based on the detection threshold of a sensor used to detect the user 300. For example, the user 300 may be considered "proximate" to the communal computing device 100 when the user is close enough that a camera on the communal computing device 100 can form an image of the face of the user 300. Thus, the communal computing device 100 may detect the presence of the user 300 without any direct user interaction.

When the user 300 is detected in proximity of the communal computing device 100 by a sensor or wireless communications interface on the communal computing device 100, a data describing a low-fidelity identification signal may be sent from the communal computing device 100 via the network 102 to the cloud-based provider 104. The low-fidelity identification signal 302 communicates data captured by the communal computing device 100 (e.g., an image or audio) to the cloud-based provider 104. The captured audio data may be of short duration (e.g., less than five seconds) or low quality (e.g., sample rate≤20 kHz). The cloud-based provider 104 can, as described below, evaluate the low-fidelity identification signal 302 to identify the user 300.

The low-fidelity identification signal 302 is sufficiently trustworthy to identify the user 300 and provide a first level of functionality, but not to authenticate the user 300 and provide a higher level of functionality. The low-fidelity identification signal 302 may include information that the user 300 does not consider private, can be obtained without direct user interaction with the communal computing device 100, and may be stored by the cloud-based provider 104. The low-fidelity identification signal 302 may also be generated by data accessible to the communal computing device 100 without the use of sensors. For example, scheduling information such as a shared calendar may identify which people are likely to be present in the same room as the communal computing device 100 at a particular time. The communal computing device 100 may make inferences from this type of information to identify the user 300 as one of the people identified in, for example, the calendaring data.

The low-fidelity identification signal 302 may be referred to as a "weak" identification signal because it may not be sufficient to uniquely or securely identify the user 300. For example, the low-fidelity identification signal 302 may have the characteristic of a false acceptance rate or false rejection rate of around 1:1000, of around 1:5000, or of around 1:10,000. Thus, out of, for example, every 1000 low-fidelity identification signals 302 the user 300 may be incorrectly identified. While this level of accuracy may be inadequate for providing access to private data, it can be sufficient for identifying the user 300 to provide some limited access to data and device functionality.

Figure 4:
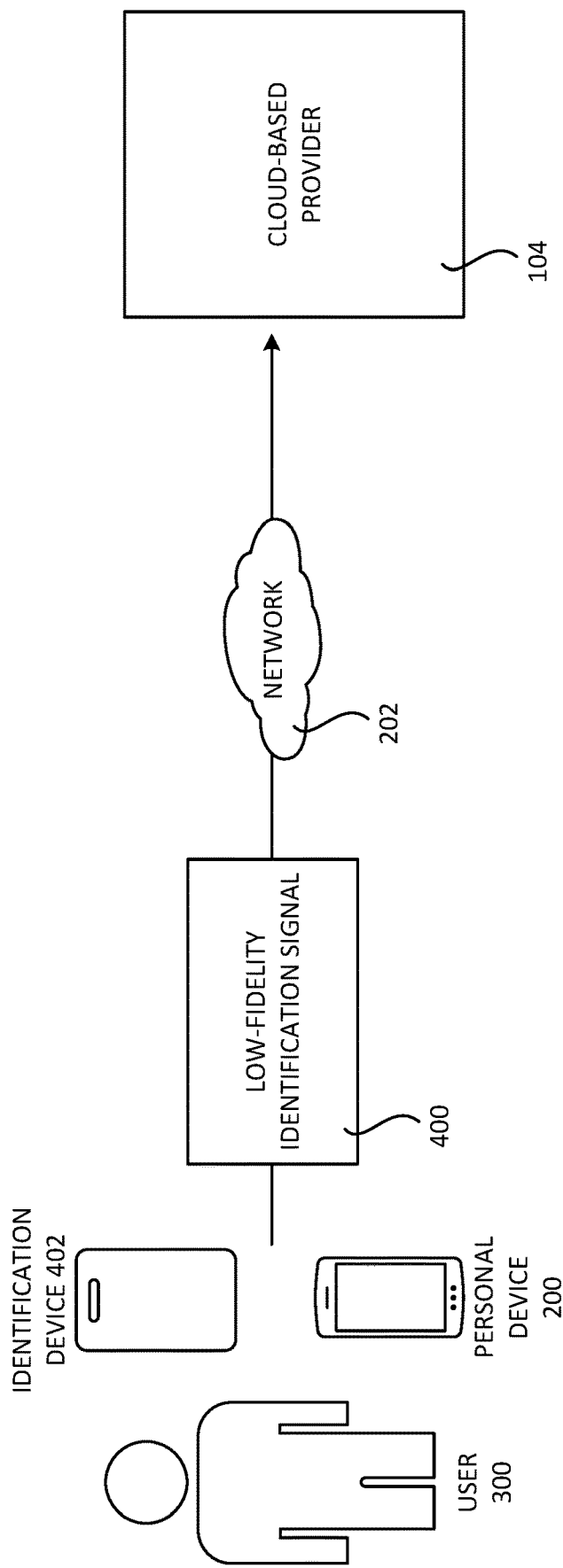
FIG. 4 is a diagram showing a transmission of a low-fidelity identification signal from the personal device to the cloud-based provider.

FIG. 4 is a diagram showing a low-fidelity identification signal 400 being provided by a device other than the communal computing device 100, such as an identification device 402 or the personal device 200. This low-fidelity identification signal 400 is communicated via the network 202 to the cloud-based provider 104. The identification device 402 is a device that provides an identifier that is associated with the user 300. The identification device 402 may be a security token that is a small hardware device which includes a number that uniquely identifies the user 300 associated with the identification device 402. For example, the identification device 402 may be implemented as a contactless smart card that uses a wireless technology such as near field communication (NFC) or radio frequency identification (RFID) to communicate an ID number. The identification device 402 is not necessarily a computing device in that it may lack a processor and/or memory as well as input or output devices.

The personal device 200 may also be the source of a low-fidelity identification signal 400. The personal device 200 may provide a device-specific identifier such as a hardware ID, a serial number, or an integrated circuit card identifier (ICCID) from a subscriber identification module (SIM). Additionally, the personal device 200 may provide an account-specific identifier such as a phone number, a username, an email address, or the like.

Correlation between any number, code, account name etc. provided in the low-fidelity identification signal 400 with an identity of the user 300 may be stored or accessible by the cloud-based provider 104. Thus, when a hardware ID is received by the cloud-based provider 104, it can use a lookup table or other technique to correlate that hardware ID with a known identity of a user.

Figure 5:
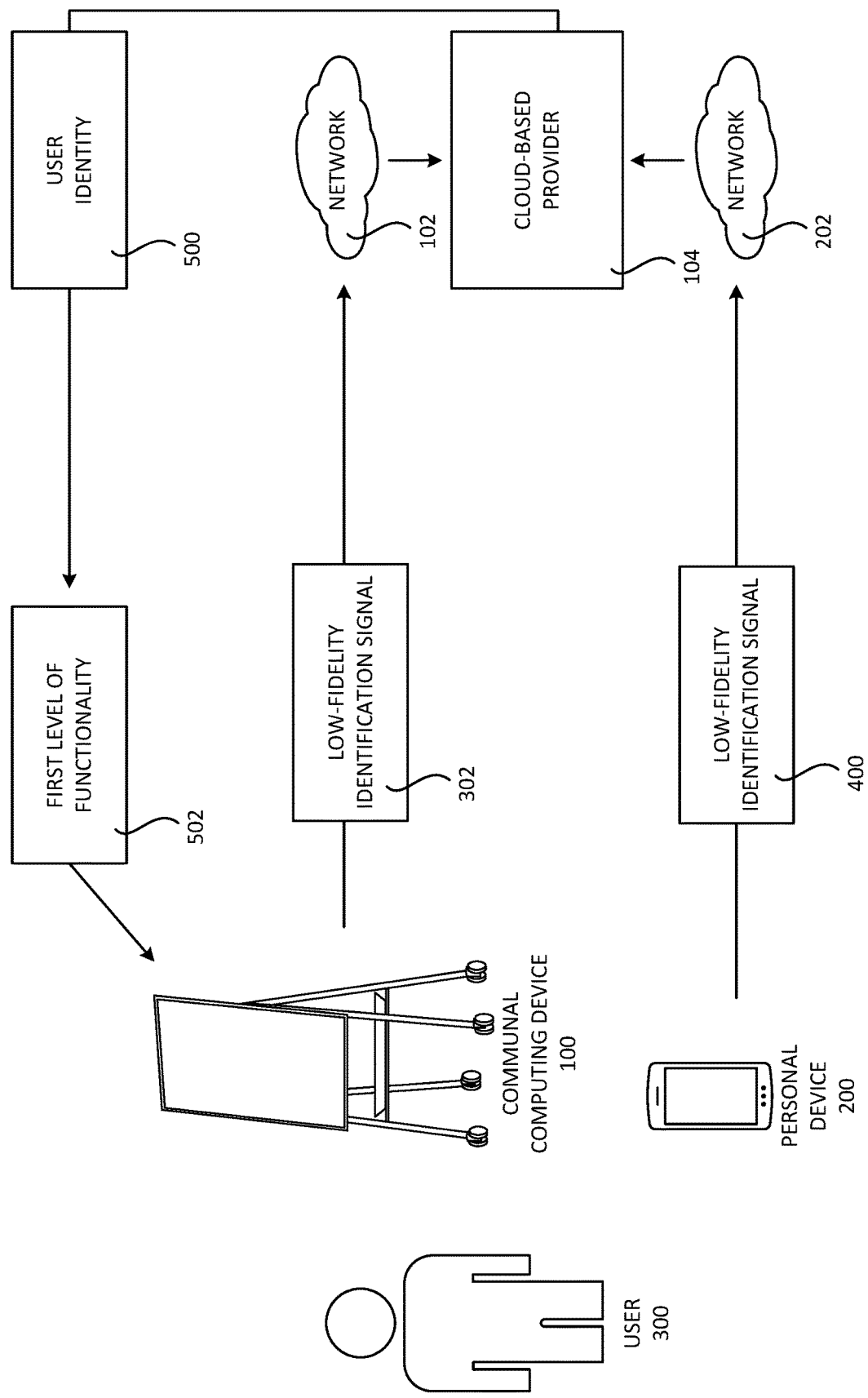
FIG. 5 is a diagram showing identification of a user and the provision of a first level of functionality on the communal computing device.

FIG. 5 shows identification of the user 300 based on multiple low-fidelity identification signals 302, 400. Each low-fidelity identification signal 302, 400 may have a moderately high probability of being incorrect (e.g., 1:5000 error rate). In an implementation, two or more low-fidelity identification signals 302, 400 may be used to identify the user 300. More than two signals may be used, for example, three, four, or more low-fidelity identification signals 302, 400 may be used to identify the user 300. Use of a greater number of separate signals provides greater confidence in the identity of the user 300.

In this example, the communal computing device 100 provides a first low-fidelity identification signal 302 via the network 102 to the cloud-based provider 104. The personal device 200 provides a second low-fidelity identification signal 400 via the network 202 to the cloud-based provider 104. For example, the first low-fidelity identification signal 302 provided by the communal computing device 100 may be an image of the face of the user 300. The second low-fidelity identification signal 400 provided by the personal device 200 may be a hardware ID of the personal device 200.

With these two low-fidelity identification signals 302, 400, the cloud-based provider 104 may be able to determine the identity of the user 300. For example, a profile or account of the user 300 available to the cloud-based provider 104 may include a self-snapshot of the user 300 and other information about the user's devices such as the hardware ID of the personal device 200. Facial recognition may be performed by the cloud-based provider 104 to determine that the image captured by the communal computing device 100 is the same face included in the picture stored with the user's account and may also match the hardware ID provided in the low-fidelity identification signal 400 with the hardware ID stored in the user's account.

Although facial recognition based on two-dimensional images of a person's face created by a visual-light camera (e.g. a standard smartphone camera using RGB or similar color space) can be spoofed using a printed image of the face or other technique, this level of low-fidelity identification may be sufficient to identify but not authenticate the user 300. The accuracy of the identification is further increased by use of the second low-fidelity identification signal 400. Although it is possible that someone other than the user 300 may have brought the personal device 200 into proximity of the communal computing device 100, using both the hardware ID and the user's face increase confidence in the identification.

If the two (or more) low-fidelity identification signals 302, 400 both indicate the same user 300, the cloud-based provider 104 may communicate a user identity 500 to the communal computing device 100. Due to the existing trust relationship between the communal computing device 100 and the cloud-based provider 104, the communal computing device 100 relies upon the user identity 500 provided by the cloud-based provider 104 to enable a first level of functionality 502.

The first level of functionality 502 may reflect that at this point the user 300 has been identified but has not yet been authenticated. Thus, the first level of functionality 502 may provide access to public data, basic device functions, and certain user data that the user 300 does not consider private or necessary to secure with authentication. For example, the first level of functionality 502 may allow the user 300 to view the weather, traffic, news, etc. on the communal computing device 100. Data associated with the user 300 that may be stored in the cloud-based provider 104 may be made available to the communal computing device 100 to components such as a customized user interface of the communal computing device 100 based on preferences of the user 300 such as language, font size, desktop image, etc. Particular files or data that the user 300 elects to share on the basis of identification (rather than authentication) such as the user's public calendar may also be provided to the communal computing device 100.

With this identification technology, the user 300 is able to begin using the communal computing device 100 without a cumbersome, time-consuming, or insecure (e.g. entering a password in front of other users) login process. Although not shown in FIG. 5, the communal computing device 100 may identify and interact with multiple users simultaneously. For example, each of the people present in a conference room may be identified by the communal computing device 100 and each may have access to the first level of functionality 502. The first level of functionality 502 may be different for different users based on the respective user profiles available to the cloud-based provider 104. For example, different users may choose to share different information and files as part of the first level of functionality 502.

Identifying multiple users also provides further options such as identifying when all members of a scheduled meeting are present and providing access to documents that are associated with all the users identified by the communal computing device 100. In an implementation, the first level of functionality 502 may include the ability to send an audio file and/or transcript of conversations detected by the communal computing device 100 to each of the users that have been identified. This may be a default setting on the communal computing device 100 such that at the conclusion of a meeting or gathering the recording/transcript is sent to an account (e.g., email address, cloud drive, etc.) associated with each of the identified participants without specific action by any of the participants. The trust relationship between the communal computing device 100 and the cloud-based provider 104 may provide the communal computing device 100 with access to the account information for each of the multiple users. Alternatively, the first level of functionality 502 may allow any of the participants to instruct the communal computing device 100 to send the recording/transcript.

Figure 6:
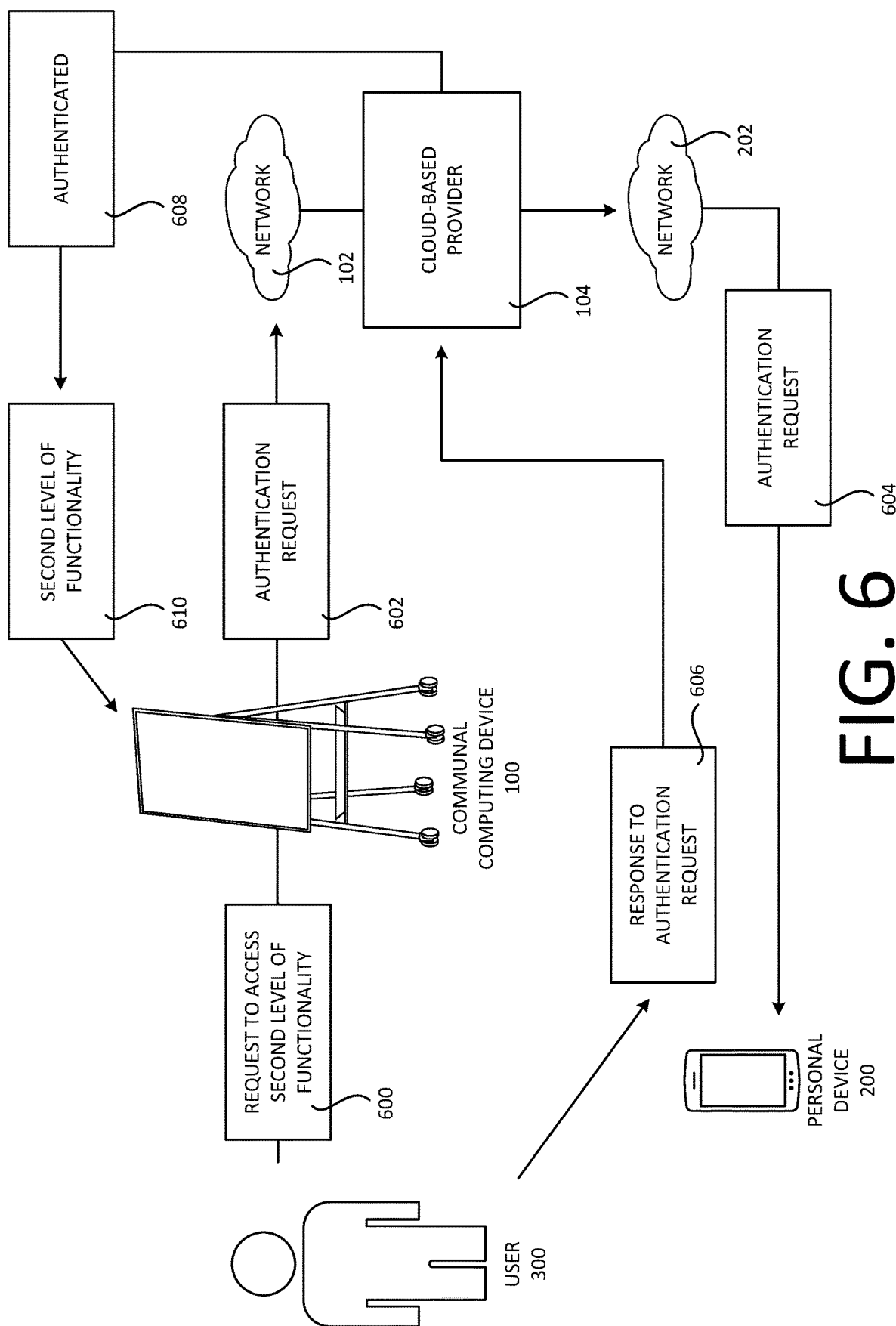
FIG. 6 is a diagram showing authentication of the user and the provision of a second level of functionality on the communal computing device.

FIG. 6 is a diagram showing authentication of the user 300 to the communal computing device 100. As discussed briefly above, traditional techniques for authenticating on a computing device may be cumbersome or insecure when used on a communal computing device 100. For example, the user 300 may wish to avoid typing her password on a large touchscreen that is being viewed by multiple other users. Similarly, biometric security typically requires a per-device enrollment so the user 300 would need to go through a potentially lengthy enrollment process with specific hardware on the communal computing device 100. This may be inefficient resulting in consumption of processing cycles and energy if, for example, the user 300 needed to enroll his or her biometric information on a different laptop computer each day at school or work. Furthermore, due to the highly secure nature of biometric data, it may be undesirable to store it on a communal computing device 100 (or the cloud-based provider 104) that is used by others and not physically controlled by the user 300. Also, including biometric hardware on the communal computing device 100 may increase cost.

The user 300 after being identified to the communal computing device 100 as shown in FIG. 5, may request access to a second level of functionality 600 on the communal computing device 100. The request may be a direct indication that the user 300 wishes to be authenticated on the communal computing device 100 by, for example, touching an "authenticate" icon on a screen of the communal computing device 100. Requesting access to data, programs, or device functionality that is not included in the first level of functionality may also be interpreted as a request to access the second level of functionality 600. Before providing this second level of functionality, the communal computing device 100 may require that the status of the user 300 is changed from "identified" to "authenticated."

The communal computing device 100 can send an authentication request 602 through the network 102 to the cloud-based provider 104. The authentication request 602 includes the identity of the user 300 as recognized by the communal computing device 100. The cloud-based provider 104 may identify the personal device 200 associated with a user profile that matches the user identity provided in the authentication request 602. The cloud-based provider 104 can then send an authentication request 604 through the network 202 to the personal device 200. Thus, because the authentication request 602, 604 is mediated by the cloud-based provider 104, it is not necessary for the personal device 200 and the communal computing device 100 to have undergone any pairing or device-to-device communication.

The authentication request 604 received at the personal device 200 may ask the user 300 to enter a PIN, password, interact with the biometric sensor, or otherwise provide a strong signal confirming his or her identity. The personal device 200 may include a biometric sensor that is already enrolled with the user 300 such as a fingerprint reader, a voice authentication system, an infrared camera, or the like. This type of strong identity signal requires some type of affirmative action on the part of the user 300 and is more difficult to provide than the low-fidelity identification signal 302, 400 shown in FIG. 5. However, the difficulty of providing a strong identity signal provides security that enables access to higher levels of functionality on the communal computing device 100.

The user 300 provides a response 606 to the authentication request that is provided to the cloud-based provider 104. The response 606 may be the entry of a PIN or password. For biometric identification, the response 606 is the signal generated by the user 300 interacting with the biometric hardware on the personal device 200. The personal device 200 may include biometric hardware such as three-dimensional depth camera, an infrared (IR) camera, a microphone array, a fingerprint sensor, or the like.

The cloud-based provider 104 evaluates the response 606 to the authentication request to determine if it matches information stored in the user profile. For example, a hash of the PIN or password may be matched with a stored hash. If there is a match, then the cloud-based provider 104 generates an indication that the user 300 is authenticated 608. Additionally, or alternatively, the personal device 200 may indicate that the user 300 has successfully authenticated such as by comparing signals collected from biometric hardware with enrolled data previously stored on the personal device 200. The authentication signal sent from the personal device 200 to the cloud-based provider 104 may be trusted by the cloud-based provider 104 and forwarded to the communal computing device 100 because of the trust relationship between the personal device 200 and the cloud-based provider of 104. If the response 606 to the authentication request is not correct, the cloud-based provider 104 may maintain the status of the user 300 as identified but not authenticated or alternatively may logoff the user 300.

In response to the cloud-based provider 104 identifying the user 300 as authenticated 608 to the communal computing device 100, the communal computing device 100 may enable access to a second level of functionality 610. The trust relationship between the personal device 200 and the cloud-based provider 104 together with the trust relationship between the communal computing device 100 and the cloud-based provider 104 allows the communal computing device 100 to trust the authenticated 608 indication even though the user 300 has not authenticated by direct interaction with the communal computing device 100.

The second level of functionality 610 includes access to additional data and functionalities beyond that provided in the first level of functionality 502. For example, the second level of functionality 610 may include private data of the user 300 and applications of the user 300 that are not generally available on the communal computing device 100. For example, the second level of functionality 610 may allow the user 300 to access his or her files on a cloud drive and to send and receive email messages. The second level of functionality 610 may, however, provide less access than the user 300 would have on his or her personal device 200 or another private computing device. For example, sensitive documents like financial records and employee evaluations may be prevented from sharing with the communal computing device 100 even after the user 300 has been authenticated. This may be due to the communal nature of how the communal computing device 100 is used, which may make it inappropriate to share certain types of documents or information. The second level of functionality 610 may include all of the functionality that is included with the first level of functionality 502.

Figure 7:
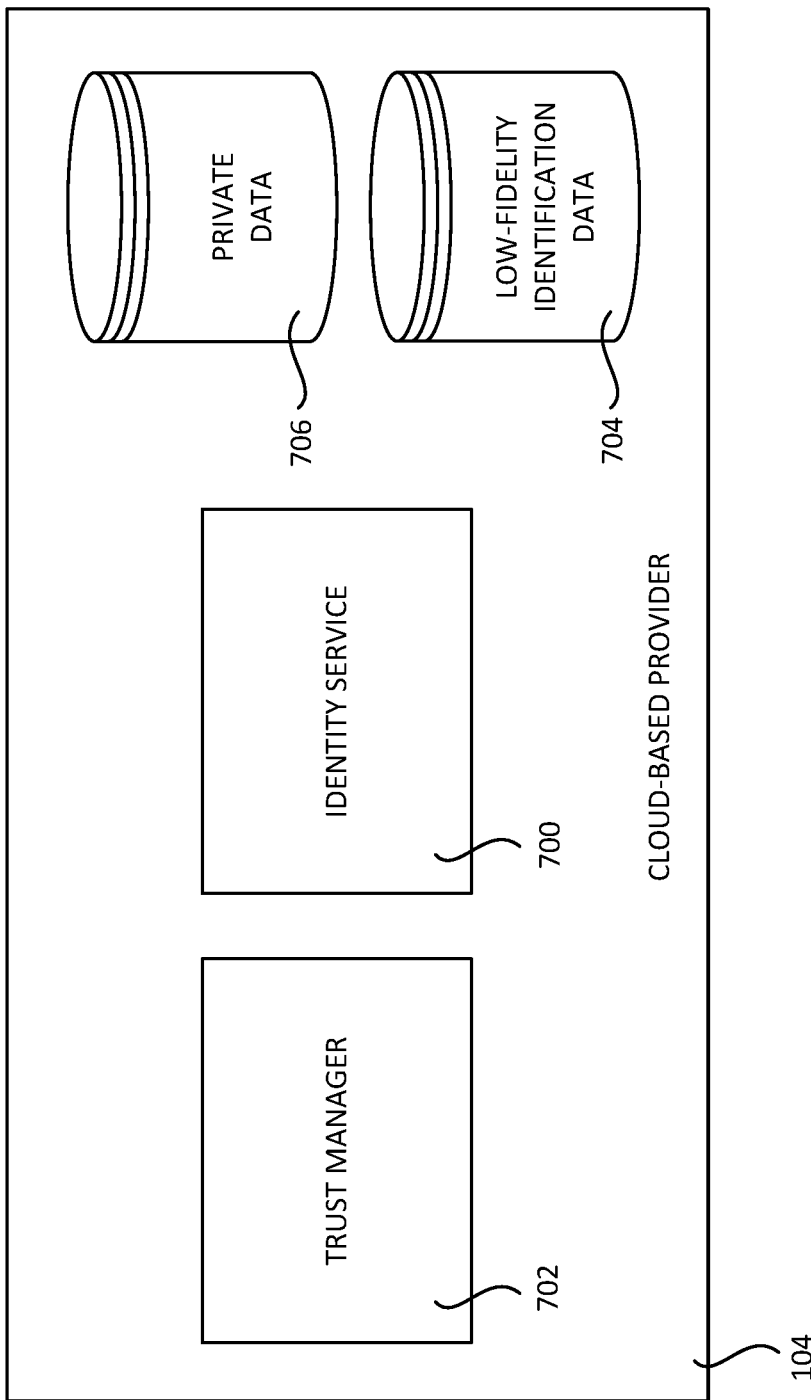
FIG. 7 is a schematic diagram showing functionality and data associated with the cloud-based provider.

FIG. 7 is a diagram showing an illustrative configuration of aspects of the cloud-based provider 104. The cloud-based provider 104 may be implemented on one or more physical or logical computing devices located at a single site or distributed across multiple physically separate sites. The cloud-based provider 104 includes a centrally-managed identity service 700. Identity service 700 may maintain secure records of user and device identities that can be referenced to verify that a given user or device is, in fact, the user/device known to the identity service 700. The centrally-managed identity service 700 may be managed by a third party that is separate from the user 300 and owner of the communal computing device 100. For example, the centrally-managed identity service 700 may be a service that provides digital IDs or digital signature certificates. One example of the centrally-managed identity service 700 is the AZURE ACTIVE DIRECTORY service from MICROSOFT CORPORATION.

The cloud-based provider 104 may also include a trust manager 702 that determines a level of trust in the identity of a user. The level of trust may be based on the number and type of identification signals. For example, the level of trust may increase with an increasing number of low-fidelity identification signals that all indicate the same user identity. If one of a plurality of low-fidelity identification signals indicates a different identity than the others, the trust manager 702 may reduce the level of trust.

Authentication signals may provide higher levels of trust and low-fidelity identification signals. Thus, an authenticated user may be provided a greater level of trust by the trust manager 702 than an identified user. Within the authentication signals, some signals may be associated with a higher level of trust than others. For example, a user authenticated with a password may be provided with greater trust than a user authenticated with a PIN. A user identified using biometrics may be provided with more trust than a user authenticated with a password or PIN. An increasing number of authentication symbols may also increase trust. For example, a user authenticated with both a password and a fingerprint may receive a higher level of trust than a user authenticated with only one authentication signal.

Thus, the level of trust may vary along a spectrum and greater levels of functionality may be provided on the communal computing device 100 as the level of trust increases. For example, if the trust manager 702 determines that there is no trust in a user 300, then the user 300 may be prevented from accessing the communal computing device 100 or may be provided with access to only basic functions. If the user 300 is identified, then the trust manager 702 may extend a greater level of trust to the user 300 and provide a first level of functionality as described above.

Authenticated users may receive more trust than identified users and the trust manager 702 may instruct the communal computing device 100 to provide authenticated users with the second level of functionality described above. Users authenticated by more than one authentication signal may receive a still higher level of trust and be able to access a third level of functionality that includes additional functionality such as the ability to change network settings on the communal computing device 100 or access to user files that contain financial information. Of course, there may be a greater or lesser number of different levels of access.

The cloud-based provider 104 may also store low-fidelity identification data 704 as compared to the low-fidelity identification signals 302, 400. The low-fidelity identification data 704 may include, for example, a visible-light photograph of the user 300 for use in facial recognition, a voiceprint of the user 300 for use in voice identification, a device ID of the personal device 200, and a serial number of an identification device 402. The low-fidelity identification data 704 may be data that does not include private information of the user 300 and is not of sufficient resolution or quality to provide the levels of accuracy necessary for biometric identification. Therefore, concerns related to storage of this data on the cloud-based provider 104 are minimized.

Private data 706 may also be stored on the cloud-based provider 104 or accessible to the cloud-based provider 104. The private data 706 of the user may include user files, account login information for services and programs such as email, and personal information about the user 300 such as full name, age, contact information, etc.

Figure 8:
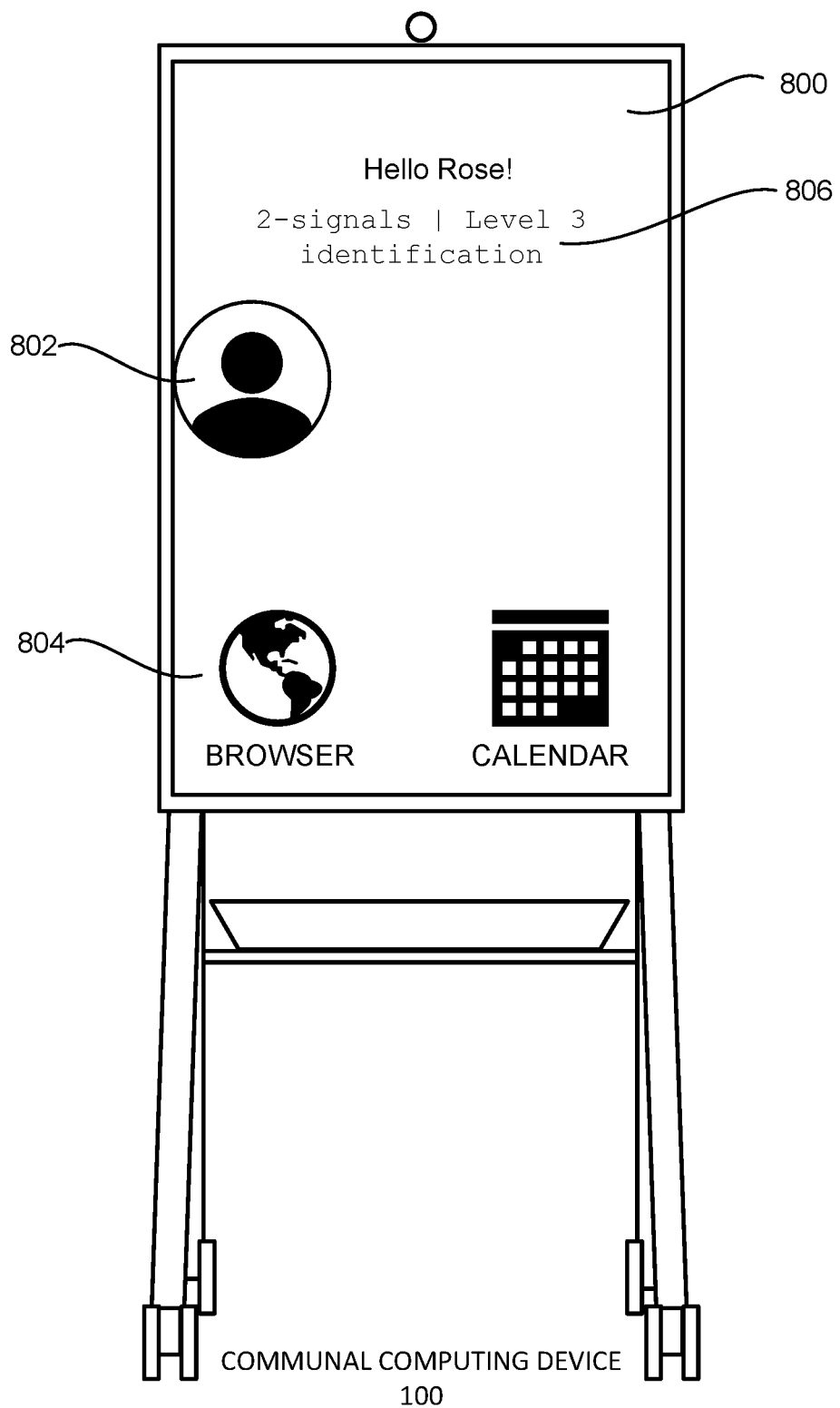
FIG. 8 is a user interface diagram showing an illustrative user interface presented by the communal computing device when providing the first level of functionality.

FIG. 8 shows an illustrative user interface (UI) 800 that may be presented on the communal computing device 100 when a user has been identified but not authenticated. The UI 800 may include a user icon 802 representing a user that has been identified to the communal computing device 100. The user icon 802 may include, for example, an image of the user and a username. If the communal computing device 100 has identified multiple users in its proximity, a user icon 802 may be generated for each of the identified users. Selection of the user icon 802 may enable access to other features associated with the user identity such as access to documents associated with the user and the ability to authenticate on the communal computing device 100. The UI 800 has been simplified for discussion purposes and might include additional information or be configured differently than that shown in FIG. 8.

The identified user may have access to a limited selection of programs 804 on the communal computing device 100 such as, for example, a browser and a calendar. Thus, the user may be passively identified and gain access to certain features on the communal computing device 100 such as programs 804 without needing to log in. This may be referred to as "ambient identification" in which the user is recognized based on a passive identification signal such as his or her face, voice, or an identifier transmitted by a device of the user.

The user interface 800 may be generated as part of the first level of functionality 502 shown in FIG. 5 in response to a plurality of low-fidelity identification signals 302, 400. An identification qualifier 806 may indicate the number of low-fidelity identification signals used or a level of confidence in the identification (e.g., 1 to 5 with larger numbers indicating greater confidence). If the user interacts with the UI 800 in an attempt to access the functionality that is not available to an identified user, the communal computing device 100 may generate an authentication request 602 as shown in FIG. 6.

Figure 9:
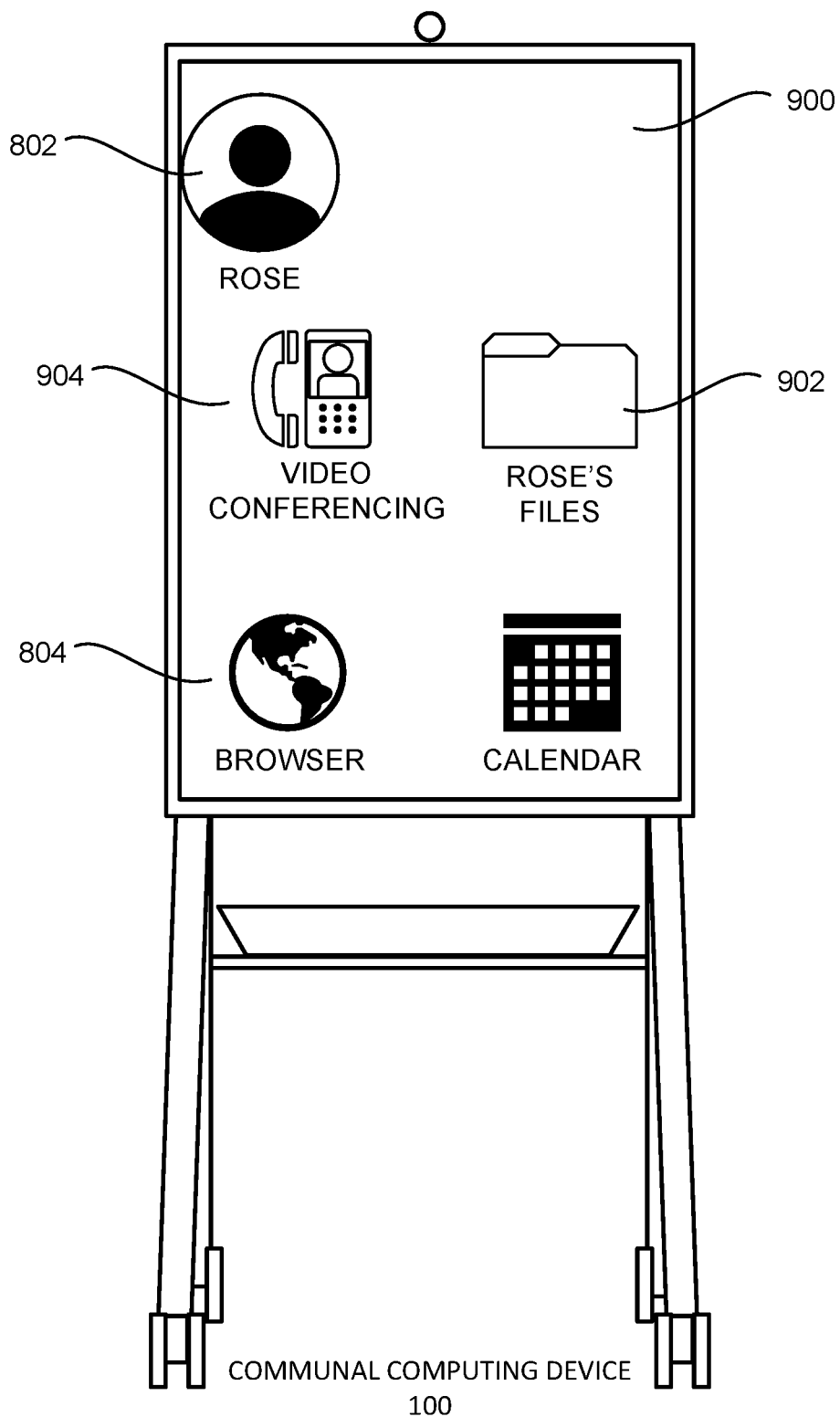
FIG. 9 is a user interface diagram showing an illustrative user interface presented by the communal computing device when providing the second level of functionality.

FIG. 9 shows an illustrative UI 900 that may be presented on the communal computing device 100 once the user has been authenticated. The UI 900 may include the user icon 802. Once authenticated, the user icon 802 may be associated with additional functionality such as the ability to fully access private data of the user that is stored in the cloud. A file icon 902 may provide access to files or documents of the user. This type of content may be limited to only UIs presented to users that are successfully authenticated. Authentication may also enable access to additional programs 904 such as a video conferencing application.

The type of programs 904 and the private data that may be accessed can depend on the level of trust in the identity of the user. If the user is authenticated through multiple strong identity signals such as a password and biometric data, then additional programs and files may become available on the communal computing device 100. The programs 804 that are available to the identified user may remain available in the UI 900 once the user has been authenticated. The UI 900 has been simplified for discussion purposes and might include additional information or be configured differently than that shown in FIG. 9.

Figure 10:
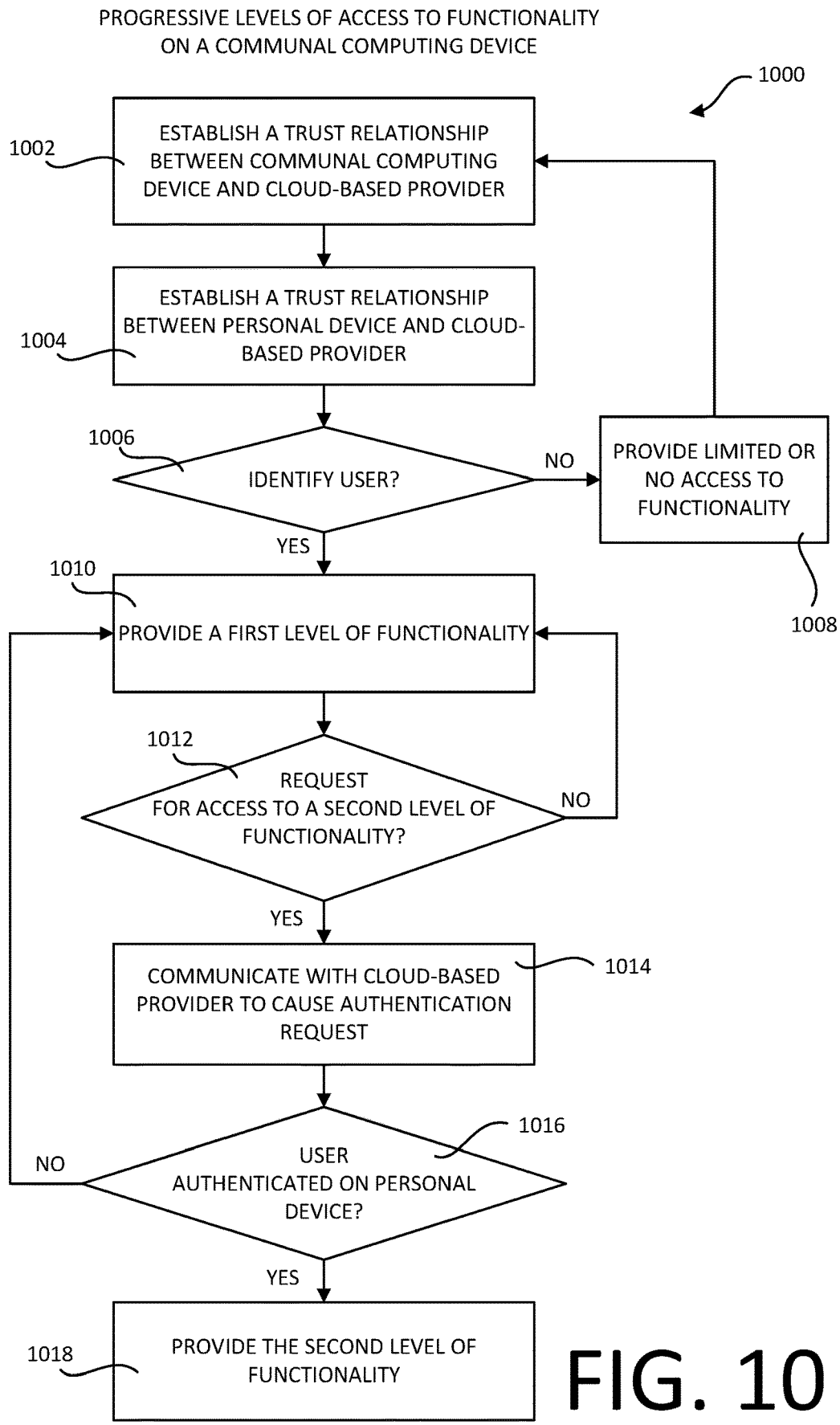
FIG. 10 is an illustrative flow diagram showing a process for providing progressive levels of access to functionality on the communal computing device.

FIG. 10 is a flow diagram showing a process 1000 for providing progressive levels of access to functionality on the communal computing device 100 described above. It should be appreciated that the logical operations described herein with regard to the flow diagram can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

At 1002, a trust relationship is established between the communal computing device 100 and the cloud-based provider 104. This may be implemented as the trust relationship shown in FIG. 1. This trust relationship may, for example, share user identification and user authentication data between the communal computing device 100 and the cloud-based provider 104. The communal computing device 100 may be an interactive digital whiteboard in some implementations. The cloud-based provider 104 may include the data and functionality illustrated in FIG. 7. For example, the cloud-based provider 104 may include a cloud-based trust entity that maintains the identity of the user 300 and regulates access to private data of the user 300.

At 1004, a trust relationship established between the personal device 200 and the cloud-based provider 104. This may be implemented as a trust relationship shown in FIG. 2. This trust relationship may be pre-established prior to the user 300 beginning interaction with the communal computing device 100. The personal device 200 may be a smartphone in some implementations. Similar to the trust relationship with the communal computing device 100, the trust relationship between the personal device 200 and the cloud-based provider 104 may enable sharing of user identification and user authentication data.

At 1006, is determined if the user 300 is identified. The user 300 may be identified by a plurality of low-fidelity identification signals using any of the discussed above. For example, a sensor on the communal computing device 100 may detect the face or voice of the user 300 and confirm the identity with the communal computing device 100. Specifically, the communal computing device 100 may include a camera or video camera that can capture a visual-light photograph of the face of the user and use facial recognition to identify the user 300 even if a visual-light photograph is not suitable to be used for authentication. As an additional example, a microphone that captures audio of the user's voice may be analyzed to determine if a voiceprint of the user is recognized. The quality of the audio used for the voice analysis may be insufficient to provide definitive authentication of the user 300 but can provide a signal that is sufficient to identify the user 300.

A hardware ID of a device associated with user 300 may also be used to identify the user to the communal computing device 100. The device which provides the hardware ID may be the same as the personal device 200 or it may be different. For example, an identification badge that includes an RFID chip may provide an identifier to the communal computing device 100.

Additionally, the location of a device associated with the user 300 may function as a low-fidelity identification signal. This device may also be the same or different from the personal device 200. Location of the device is based on comparison to a known or fixed location and is different than proximity to the communal computing device 100. For example, the location of the device may be determined by global positioning system (GPS) satellites, triangulation from cellular towers, or connection to a Wi-Fi hotspot. The detected location of the device can be compared to the location of the communal computing device 100. If the locations are the same or within a threshold distance of each other than that may be interpreted as a signal confirming the identity of the user 300. For example, if a laptop computer associated with the user 300 is connected to the same Wi-Fi hotspot used by the communal computing device 100, and that may be one low-fidelity identification signal.

Other indications that do not involve sensed data or data received from the personal device 200 (or other device associated with the user 300) can also function as low-fidelity identification signals. For example, information available to the communal computing device 100 indicating that the user 300 should be present can be interpreted as a week identification signal. For example, if a meeting is scheduled using the communal computing device 100 and the user 300 has responded that he will attend the meeting, then the communal computing device 100 may assume that the user 300 is present during the time when the meeting is scheduled.

The number of separate low-fidelity identification signals necessary to identify the user 300 may be configured to be one, two, three, or a larger number. For example, the user 300 may not be identified at 1006 unless there are at least two separate low-fidelity identification signals. For example, the user 300 may be identified only if the camera of the communal computing device 100 capture an image that matches the user's face and the communal computing device 100 detected the hardware ID of a device associated with the user 300.

At 1008, the user who has not been identified may be provided limited or no access to functionality of the communal computing device. If the user 300 is not identified, then process 1000 proceeds along the "no" path to 1008. The communal computing device 100 may not provide any access to an unidentified individual. Alternatively, if the user 300 cannot be identified, he or she may be provided with "guest" access which is limited to only basic functions of the communal computing device 100 and may prohibit the user 300 as a guest from making changes or saving any files on the communal computing device 100.

If, however, the user identified, process 1000 proceeds from 1006 along the "yes" path to 1010. Further interaction between the communal computing device 100 and the user 300 may be performed in light of the identity of the user 300. Because the user 300 has been identified but not yet authenticated, it is possible that the user 300 is, in fact, different than the individual identified. Thus, the identity may be thought of as a probable identity or as a tentative identification.

At 1010, a first level of functionality is provided to the identified user. The first level of functionality may allow the user 300 to access applications that are available to all users of the communal computing device 100. For example, the user 300 may access a browser application and a calendar application as shown in FIG. 8. The first level of functionality may also provide customization of the communal computing device 100 based on user preferences associated with the user. User preferences might include, for example, volume, brightness, accessibility settings like narration or magnifying glass functionality, and UI language. The user preferences may be received from a user profile that can be obtained from the cloud-based provider 104. Any changes made to user preferences by an identified user may be persisted to a user profile that is managed or accessible by the cloud-based provider 104.

At 1012, is determined if there is a request for access to a second level of functionality. The request for access to a second level of functionality may include the user 300 attempting to access data or a feature that is not available as part of the first level of functionality. For example, if the user 300 attempts to launch an email application using his or her identity, the communal computing device 100 may require authentication before allowing access to email functionality. Similarly, if the user 300 attempts to open a file location that is private or secured, the communal computing device 100 may require authentication before providing access. If there is a request for access to the second level of functionality, process 1000 proceeds along the "yes" path to 1014. If, user interaction with the communal computing device does not include a request for access to the second level functionality, then process 1000 proceeds along the "no" path and returns to 1010 where the communal computing device continues to provide the first level of functionality.

At 1014, the communal computing device communicates 100 with the cloud-based provider 104 to cause an authentication request to be sent to a personal device 200 associated with the user. One implementation of this authentication request is shown in FIG. 6. The cloud-based provider 104 receives a message from the communal computing device 100 requesting authentication of the user 300. The authentication request includes the identity of the user 300. Thus, with this identity, the cloud-based provider 104 is able to identify the appropriate personal device 200. Of course, if the user 300 was misidentified than the cloud-based provider will send an authentication request to the wrong device and the user 300 will not be able to authenticate.

The cloud-based provider 104 sends its own authentication request to the personal device 200. The authentication request sent to the personal device 200 may be a request to enter a password or pin. The authentication request may also be instructions to authenticate using a biometric reader on the personal device 200.

At 1016, is determined if the user 300 has successfully authenticated on the personal device 200. The personal device 200 may send the response to the cloud-based provider 104 indicating that the user 300 successfully (or unsuccessfully) responded to the authentication challenge. If the user has not responded successfully, for example by entering an incorrect password, then process 1000 be proceeds along the "no" path and return to 1010 where the communal computing device continues to provide the first level of functionality. The user 300 may continue to receive the first level functionality until he or she successfully authenticates on the personal device 200. Alternatively, after one or more failed attempts to authenticate, the communal computing device 100 may remove access to the first level of functionality.

If the user successfully authenticates on the personal device, then process 1000 proceeds along the "yes" path to 1018. At 1018, the communal computing device provides the second level functionality. Due to the trust relationship between the personal device 200 and the cloud-based provider 104, the cloud-based provider 104 trusts the indication from the personal device 200 that the user 300 has successfully authenticated. Cloud-based provider 104 now considers the user 300 successfully authenticated and communicates the authenticated status of the user 300 to the communal computing device 100. The trust relationship between the communal computing device 100 and the cloud-based provider 104 allows the communal computing device 100 to rely upon the authentication recognized by the cloud-based provider 104 and in turn recognize the user 300 as authenticated on the communal computing device 100.

The second level of functionality provided by the communal computing device 100 may include functionality similar to that shown in FIG. 9. For example, the second level of functionality may allow the user 300 to install his or her own applications on the communal computing device 100. Additionally, this level of functionality may allow the user 300 to access private data on the communal computing device 100 such as accessing his or her email account, or personal files in a network-accessible storage location.

Even though the user 300 is authenticated, there may be some limitations on which types of programs and or private data are accessible on the communal computing device 100. For example, license restrictions on software installations may prevent some of the user's own programs from being installed on the communal computing device 100. As an additional example, some private data that is not suitable for display in a public or communal setting may be prevented from access via the communal computing device 100. For example, files containing the user's financial information may be typically accessible when the user is authenticated on a personal computer or on the personal device 200, even when user 300 is authenticated, the same files may be inaccessible on the communal computing device 100.

FIG. 11 is a computer architecture diagram showing an illustrative computer hardware and software architecture for a computing device 1100 that can implement the various technologies presented herein. In particular, the architecture illustrated in FIG. 11 can be utilized to implement a communal computing device 100 such as an interactive digital whiteboard, shared kiosk, smart television, in-car computer, desktop or laptop computer, or another type of communal computing device.

The computing device 1100 illustrated in FIG. 11 includes one or more central processing unit(s) 1102 (CPU), one or more instances of system memory 1104, which may include a random-access memory 1106 (RAM) and a read-only memory (ROM) 1108. A system bus 1110 may function to couple the system memory 1104 to the CPU 1102 and connect both to other components of the communal computing device 100. However, the communal computing device 100 may also be implemented in an architecture that does not include a system bus 1110. A basic input/output system (BIOS" or "firmware) containing the basic routines that help to transfer information between elements within the communal computing device 100, such as during startup, can be stored in the ROM 1108. The communal computing device 100 further includes a mass storage device 1112 for storing a communal computing device operating system 1114, application programs, such as single user aware applications (not shown), multi-user aware applications (not shown), and other types of programs. The mass storage device 1112 can also be configured to store other types of programs and data.

The mass storage device 1112 may be connected to the CPU 1102 through a mass storage controller (not shown) connected to the system bus 1110. The mass storage device 1112 and its associated computer-readable media provide non-volatile storage for the computing device 1100. Although the description of computer-readable media contained herein refers to a mass storage device, such as a hard disk, CD-ROM drive, DVD-ROM drive, or USB storage key, it should be appreciated by those skilled in the art that computer-readable media can be any available computer-readable storage media or communication media that can be accessed by the computing device 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media can include volatile and non-volatile, removable and non-removable media implemented in any method or technology for storage of information such as computer readable instructions, data structures, program modules or other data. For example, computer storage media includes, but is not limited to, RAM 1106, ROM 1108, EPROM, EEPROM, flash memory or other solid-state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and which can be accessed by the computing device 1100. For purposes of the claims, the phrase "computer-readable storage medium," and variations thereof, does not include waves or signals per se or communication media. Thus, computer-readable storage media and communication media are mutually exclusive.

According to various configurations, the computing device 1100 can operate in a networked environment using logical connections to remote computers through a network such as the network 102. The computing device 1100 can connect to the network 102 through a network interface unit 1116 connected to the system bus 1110. It should be appreciated that the network interface unit 1116 can also be utilized to connect to other types of networks and remote computer systems such as the personal device 200 and the cloud-based provider 104. The computer 1100 can also include a local interface unit 1118 to form communicative connections with local devices such as through a wired or wireless connection with the nearby device. For example, local interface unit 1118 can connect the computing device 1100 via a cable such as an ethernet cable or USB cable to another device such as a biometric reader, a video camera, etc. Wireless connections such as BLUETOOTH, infrared, etc. may also be implemented through the local interface unit 118 such as, for example, wireless connection to the personal device 200.

The computing device 1100 may also include an input/output (I/O) controller 1120 for receiving and processing input from a number of other devices, including a keyboard, mouse, touchscreen 1122, an electronic stylus, or physical sensor(s) such as a video camera, microphone array, or fingerprint reader. Similarly, the I/O controller 1120 can provide output to a display screen, the touchscreen 1122, or other type of output device such as a speaker.

It should be appreciated that the software components described herein, when loaded into the CPU 1102 and executed, can transform the CPU 1102 and the overall computer 1100 from a general-purpose computing device into a special-purpose computing device customized to facilitate the functionality presented herein. The CPU 1102 can be constructed from any number of transistors or other discrete circuit elements, which can individually or collectively assume any number of states. More specifically, the CPU 1102 can operate as a finite-state machine, in response to executable instructions contained within the software modules disclosed herein. These computer-executable instructions can transform the CPU 1102 by specifying how the CPU 1102 transitions between states, thereby transforming the transistors or other discrete hardware elements constituting the CPU 1102.

Encoding the software modules presented herein can also transform the physical structure of the computer-readable media presented herein. The specific transformation of the physical structure depends on various factors, in different implementations of this description. Examples of such factors include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

The computing device 1100 may also include one or more physical sensor(s) 1124 such as a camera, a video camera, a microphone array, etc. A video camera may be used by the computing device 1100 to recognize users in front of the device and for video conferencing. Recognizing uses in front of the device may allow for the computing device 1100 in conjunction with the cloud-based provider 104 to identify individual users.

In light of the above, it should be appreciated that the computing device 1100 may implement the technologies and techniques discussed above and shown in FIGS. 1-10 using the communal computing device operative system 1114 and/or other software. For example, the computing device 1100 can establish a trust relationship with the cloud-based provider 104 which may be implemented in part by an encrypted data connection via the network 102 that is implemented using the communal computing device operating system 1114 or other software to recognize authentication and identification information provided by the cloud-based provider 104.

With the established trust relationship, the computing device 1100 can determine an identity of a user proximate to it through use of a physical sensor(s) 1124 and/or the local interface unit 1118. For example, one or more physical sensor(s) 1124 such as a visual-light camera or a microphone may detect the face or voice of a person and identify the person as a particular user based on data available to the cloud-based provider 104. The low-fidelity identification signal obtained by the physical sensor(s) 1124 may have an error rate that exceeds the threshold allowable for authentication signals.

The local interface unit 1118 may, additionally or alternatively, detect a signal from the personal device 200, or another device, in proximity to the computing device 1100. The signal may be sent via radio waves such as by Bluetooth, by light such as an infrared signal, or with a different technology. The signal may contain a unique identifier for the device such as a hardware ID, phone number, etc. Scheduling information available to the computing device 1100 such as a calendar entry that indicates identities of one or more users may identify a user or users who are proximate to the computing device 1100 at the date and time indicated in the calendar entry. Furthermore, a location of a second device associated with the user 300 (which may be but is not limited to the personal device 200) may be interpreted as an indication that the user 300 is proximate to the computing device 1100. Specifically, if the location for the second device is reported as being at or near a known location of the computing device 1100, then that may be a signal that the user 300 is proximate to the computing device 1100.

The user characteristics such as facial image or voice, signals from the personal device 200 proximate to the computing device 1100, a calendar entry, and location of a second device, are types of passive identity signals associated with the user 300. These passive identity signals can be obtained by the computing device 1100 without any affirmative action on the part of the user 300. This provides a friction-free and convenient way for the user 300 to be identified by the computing device 1100 if the user ops in to passive identification. In some implementations, two or more passive identity signals may be required before the user 300 is identified. For example, the computing device 1100 may be configured such that at least one passive identity signal received from a physical sensor(s) 1124 and at least one passive identity signal received from a device via the local interface unit 1118 are required before confirming the identity of a user 300.

When the user 300 is identified, the computing device 1100 may respond by using the I/O controller 1120 to modify a user interface such as the touchscreen 1122. The modification of the UI may present a first content based on the identity of the user 300. This first content may be the same or similar to that illustrated in FIG. 8. For example, it may include applications that are available to all users of the computing device 1100. These applications may be stored, for example, in the mass storage device 1112.

The computing device 1100 can also authenticate the user 300 by use of the communal computing device operating system 1114 or other software. Authentication may be made in response to receipt of an indication from the cloud-based provider 104 that a correct response to an authentication request was received from the personal device 200. Because the computing device 1100 has established a trust relationship with the cloud-based provider 104 and if the personal device 200 also has an established trust relationship with the cloud-based provider 104, then the correct authentication response provided on the personal device 200 may be trusted and relied upon by the computing device 1100. Thus, the user 300 was previously identified is now authenticated. Being authenticated provides the user 300 with access to more functionality and content on the computing device 1100. For example, the computing device 1100 may, through use of the I/O controller 1120 modify a UI such as one displayed on the touchscreen 1122 to present a second content based on authentication of the user.

The second content may include, for example, any of the content illustrated in FIG. 9. For example, the second content may include private data of the user 300. It can also include content that belongs to another user but that has been shared with the user 300. For example, if the computing device 1100 has identified multiple users in its proximity, then the second content may include documents and/or files that have been shared between two or more of the users present.

In a further implementation, the second content may be limited to content that is associated with all of the users in proximity to the computing device 1100. The second content may also be limited to content that is tagged or otherwise associated with a meeting that is scheduled on a calendar accessible by the computing device 1100. Limiting the available content in these ways may make it easier for the user 300 to identify the item of content he or she wishes to use because there is a smaller volume of content to search through. Additionally, doing so may avoid oversharing content that is not appropriate for being viewed by the users present. Furthermore, limiting the available content to only the content that is associated with the current users or with a scheduled meeting, may assist in keeping the users on task by preventing access to irrelevant or distracting documents and content.

Continuing with the meeting scenario, the computing device 1100 may be configured to generate an audio or video recording of the meeting through use of the physical sensor(s) 1124. The recording of the meeting may also include recording content generated by the I/O controller 1120 for display on a monitor such as a touchscreen 1122. Following conclusion of the meeting, any or all of this captured content may be shared with users who participated in the meeting. The conclusion of the meeting may be identified based on a scheduled ending time indicated in a calendar or similar scheduling application available to the computing device 1100.

Additionally, or alternatively, when the users move away from the computing device 1100 and are no longer detected in its proximity, the absence of people nearby may be interpreted as the end of the meeting. The meeting content, including a transcript generated from an audio recording of the meeting, may be sent by the computing device 1100 to the participants. In an implementation, identification of the users in proximity to the computing device 1100 may enable the computing device 1100 to obtain email addresses or other contact information from the cloud-based provider 104. The computing device 1100 may then send the meeting content to the email addresses associated with the participants in the meeting.

The computing device 1100 may include in the mass storage device 1112 or elsewhere computer executable instructions which, when executed by the CPU 1102 or other processor cause the computing device 1100 to implement technologies and processes discussed above. For example, the instructions may cause the computing device 1100 to establish a trust relationship with the centrally-managed identity service 700 that is part of the cloud-based provider 104. The computing device 1100 may also detect the presence of the user 300 using one or more sensors such as the physical sensor(s) 1124 and or one or more wireless communication connections such as a wireless connection implemented by the local interface unit 1118 to collect low-fidelity identification signals. Instructions may then provide for determining an identity of the user 300 based on two or more of the low-fidelity identification signals.

Furthermore, the instructions may cause the computing device 1100 to provide a first level functionality to the user 300 based on the identity of the user. The first level of functionality may be based on information about the user 300 received from the centrally-managed identity service 700 such as information from a user profile.

As discussed above, the computing device 1100 may be further configured by the instructions to detect the request to access a second level functionality. The request may be received, for example, via an input device and the I/O controller 1120. User input devices may include, but are not limited to, a keyboard, a mouse, a touch pad, a trackball, a touch screen, a joystick, image processing and gesture recognition devices, or a voice input device. Responsive to detection of the request, the instructions may cause the computing device 1100 to communicate with the centrally-managed identity service 700 to cause an authentication request to be sent to the personal device 200 associated with the user 300. After the user 300 has authenticated on his or her personal device 200, the centrally-managed identity service 700 can send an authentication signal to the computing device 1100. The computing device 1100 will then receive the indication from the centrally-managed identity service 700 that authentication of the user was performed on the personal device 200.

The instructions may then cause the computing device 1100 to provide the second level functionality to the user 300 based on the authentication. Providing the second level of functionality may include enabling access to additional data from the cloud-based provider, access to additional software program instructions contained in the mass storage device 1112 or elsewhere on the computing device 1100 or providing additional content on a UI such as a UI displayed on the touchscreen 1122. The second level of functionality may include everything included with the first level functionality and additional functionality. This additional functionality may be based on private data 706 of the user 300. For example, private data may contain files or documents of the user 300 or software applications that the user 300 can access on the computing device 1100. The second level of functionality may also be based on a confidence level in the authentication. Different authentication techniques may be associated with different levels of confidence. Combining multiple different authentication techniques may also increase the confidence level. Thus, authentication may be implemented not as a binary condition but as a sliding scale in which greater confidence in authentication provides access to greater amounts of data and functionalities.

Additionally, the executable instructions may cause the computing device 1100 to remove access to the first level functionality and or the second level functionality upon the passage of time or when users are no longer present in the proximity of the computing device 1100. For example, instructions may cause the computing device 1100 to recognize that the low-fidelity identification signals not been detected for more than a threshold period of time and remove access to one or both of the first level functionality and the second level of functionality. For example, if the video camera on the computing device 1100 does not detect any people and there are no wireless signals from mobile devices recognized by the computing device 1100, the computing device 1100 may go into a sleep or locked state. Doing so can save energy and also improve security by preventing access to functionality and data if a new individual enters the room who is not identified nor authenticated.

The threshold period of time may be configured by the user 300, it may be a default setting of the computing device 1100, or it may be configured by an owner or administrator of the computing device 1100. By way of example, the threshold period of time may be approximately five minutes, 10 minutes, 15 minutes, 30 minutes, or another length of time.

It is also contemplated that the computing device 1100 might not include all of the components shown in FIG. 11, can include other components that are not explicitly shown in FIG. 11, or can utilize an architecture different than that shown in FIG. 11.

Illustrative Embodiments

The following clauses described multiple possible embodiments for implementing the features described in this disclosure. The various embodiments described herein are not limiting nor is every feature from any given embodiment required to be present in another embodiment. Any two or more of the embodiments may be combined together unless the context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A computer-implemented method for providing progressive access to functionality provided by a communal computing device, the method comprising: establishing a trust relationship between the communal computing device and a cloud-based provider; identifying a user as being in proximity to the communal computing device based on receiving a plurality of low-fidelity identification signals; responsive to identifying the user as being in proximity to the communal computing device, providing a first level of functionality to the user on the communal computing device; receiving a request to access a second level of functionality provided by the communal computing device; responsive to receiving the request, communicating with the cloud-based provider to cause an authentication request to be sent to a personal device associated with the user, the personal device having a pre-established trust relationship with the cloud-based provider; receiving an indication from the cloud-based provider that the user has authenticated on the personal device; and providing the second level of functionality to the user on the communal computing device.

Clause 2. The computer-implemented method of clause 1, wherein the communal computing device comprises an interactive digital whiteboard, the personal device comprises a smartphone, and the cloud-based provider comprises a cloud-based trust entity that maintains an identity of the user and regulates access to private data of the user.

Clause 3. The computer-implemented method of clause 1 or 2, wherein the trust relationship shares user identification and user authentication data between the communal computing device and the cloud-based provider.

Clause 4. The computer-implemented method of any of clauses 1-3 wherein the pre-established trust relationship comprises one of registration of a device identifier for the personal device with the cloud-based provider or installation of a software token on the personal device.

Clause 5. The computer-implemented method of clauses 1-4 wherein the plurality of low-fidelity identification signals comprises at least two of: a visual-light photograph of a face of the user, a hardware identifier of a first device associated with user, a calendar entry that includes the user, a location of a second device, or a voiceprint of the user.

Clause 6. The computer-implemented method of any of clauses 1-5, wherein the first level of functionality comprises access to applications that are available to all users of the communal computing device or implementation of user preferences associated with the user.

Clause 7. The computer-implemented method of any of clauses 1-6, wherein the second level of functionality comprises installation of applications on to the communal computing device or access to private data of the user on the communal computing device.

Clause 8. At least one computer-readable storage medium having computer executable instructions stored thereon which, when executed by one or more processors, cause a computing device to perform the method of any of clauses 1-7.

Clause 9. A system comprising one or more processors; at least one computer-readable medium having computer executable instructions stored thereon which, when executed by the one or more processors, cause the system to perform the method of any of clauses 1-7.

Clause 10. A communal computing device comprising: one or more processors; at least one computer-readable medium having computer executable instructions stored thereon which, when executed by the one or more processors, cause the communal computing device to: establish a trust relationship with a cloud-based provider; determine an identity of a user proximate to the communal computing device by receiving a passive identity signal associated with the user; modify a user interface of the communal computing device to present a first content based on the identity of the user; authenticate the user in response to receipt of an indication from the cloud-based provider that a correct response to an authentication request was received from a personal device associated with the user, the personal device having an established trust relationship with the cloud-based provider; and modify the user interface of the communal computing device to present a second content based on authentication of the user.

Clause 11. The device of clause 10, wherein the communal computing device comprises an interactive digital whiteboard with a touchscreen.

Clause 12. The device of clause 10 or 11, wherein the passive identity signal comprises a first signal received from a first device associated with the user, a calendar entry that includes the user, or a second signal indicating that a location of a second device associated with the user is proximate to the communal computing device.

Clause 13. The device of any of clauses 10-12, further comprising a sensor to detect low-fidelity identification signals and wherein the passive identity signal is provided by the sensor.

Clause 14. The device of clause 13, wherein the sensor comprises: a camera and the passive identity signal comprises a visual-light photograph of the user or, a microphone and the passive identity signal comprises audio containing speech of the user.

Clause 15. The device of any of clauses 10-14, wherein the first content comprises applications that are available to all users of the communal computing device.

Clause 16. The device of any of clauses 10-15, wherein the second content comprises private data of the user.

Clause 17. The device of any of clauses 10-16, wherein the second content includes content that is shared with a second user and the second content is included in the user interface in response to identifying the second user as proximate to the communal computing device.

Clause 18. A communal computing device comprising: means for processing; at least one means for storing computer executable instructions stored thereon; means for establishing a trust relationship with a cloud-based provider; means for determining an identity of a user proximate to the communal computing device by receiving a passive identity signal associated with the user; means for modifying a user interface of the communal computing device to present a first content based on the identity of the user; means for authenticating the user in response to receipt of an indication from the cloud-based provider that a correct response to an authentication request was received from a personal device associated with the user, the personal device having an established trust relationship with the cloud-based provider; and means for modifying the user interface of the communal computing device to present a second content based on authentication of the user.

Clause 19. At least one computer-readable storage medium having computer executable instructions stored thereon which, when executed by one or more processors, cause a communal computing device to: establish a trust relationship with a centrally-managed identity service; detect a presence of a user using one or more sensors and/or one or more wireless communication connections to collect low-fidelity identification signals; determine an identity of the user based on two or more of the low-fidelity identification signals; provide a first level of functionality to the user based on the identity of the user; detect a request to access a second level of functionality provided by the communal computing device; responsive to detection of the request, communicate with the centrally-managed identity service to cause an authentication request to be sent to a personal device associated with the user; receive an indication from the centrally-managed identity service that authentication of the user was performed on the personal device; and provide the second level of functionality to the user based on the authentication.

Clause 20. The at least one computer-readable storage medium of clause 19, wherein the first level of functionality is further based on information about the user received from the centrally-managed identity service.

Clause 21. The at least one computer-readable storage medium of clause 19 or 20, wherein the second level of functionality is further based on a confidence level in the authentication.

Clause 22. The at least one computer-readable storage medium of any of clauses 19-21, wherein the second level of functionality includes the first level of functionality and additional functionality based on private data of the user.

Clause 23. The at least one computer-readable storage medium of any of clauses 19-22, having further computer-executable instructions stored thereon which cause the communal computing device to: determine that the low-fidelity identification signals have not been detected for more than a threshold period of time; and remove access to the second level of functionality.

Clause 24. A communal computing device comprising one or more processors and the at least one computer-readable storage medium of any of clauses 19-23.

CONCLUSION

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

All patents, patent applications, and other documents referenced in this disclosure are fully incorporated by reference for all that they disclose.

What is claimed is:

1. A computer-implemented method for providing progressive access to functionality provided by a communal computing device, the method comprising:
   establishing a trust relationship between the communal computing device and a cloud-based provider;
   determining the identity of a user that is in proximity to the communal computing device based on receiving a plurality of passive identification signals;
   responsive to identifying the user that is in proximity to the communal computing device, providing, based on the identity of the user, a first level of functionality to the user on the communal computing device;
   receiving a request to access a second level of functionality provided by the communal computing device;
   responsive to receiving the request, communicating with the cloud-based provider to cause an authentication request to be sent to a personal device associated with the user, the personal device having a pre-established trust relationship with the cloud-based provider;
   receiving an indication from the cloud-based provider that the user has authenticated on the personal device; and
   providing the second level of functionality to the user on the communal computing device.

2. The computer-implemented method of claim 1, wherein the communal computing device comprises an interactive digital whiteboard, the personal device comprises a smartphone, and the cloud-based provider comprises a cloud-based trust entity that maintains an identity of the user and regulates access to private data of the user.

3. The computer-implemented method of claim 1, wherein the trust relationship shares user identification and user authentication data between the communal computing device and the cloud-based provider.

4. The computer-implemented method of claim 1, wherein the pre-established trust relationship comprises one of registration of a device identifier for the personal device with the cloud-based provider or installation of a software token on the personal device.

5. The computer-implemented method of claim 1, wherein the plurality of passive identification signals comprises at least two of: a visual-light photograph of a face of the user, a hardware identifier of a first device associated with user, a calendar entry that includes the user, a location of a second device, or a voiceprint of the user.

6. The computer-implemented method of claim 1, wherein the first level of functionality comprises access to applications that are available to all users of the communal computing device or implementation of user preferences associated with the user.

7. The computer-implemented method of claim 1, wherein the second level of functionality comprises installation of applications on to the communal computing device or access to private data of the user on the communal computing device.

8. A communal computing device comprising:
one or more processors comprising at least one circuit;
at least one computer-readable medium having computer executable instructions stored thereon which, when executed by the one or more processors, cause the communal computing device to:
 establish a trust relationship with a cloud-based provider;
 determine an identity of a user proximate to the communal computing device by receiving a passive identity signal associated with the user;
 modify a user interface of the communal computing device to present a first content based on the identity of the user;
 authenticate the user in response to receipt of an indication from the cloud-based provider that a correct response to an authentication request was received from a personal device associated with the user, the personal device having an established trust relationship with the cloud-based provider; and
 modify the user interface of the communal computing device to present a second content based on authentication of the user.

9. The device of claim 8, wherein the communal computing device comprises an interactive digital whiteboard with a touchscreen.

10. The device of claim 8, wherein the passive identity signal comprises a first signal received from a first device associated with the user, a calendar entry that includes the user, or a second signal indicating that a location of a second device associated with the user is proximate to the communal computing device.

11. The device of claim 8, further comprising a sensor to detect low-fidelity identification signals and wherein the passive identity signal is provided by the sensor.

12. The device of claim 11, wherein the sensor comprises a camera and the passive identity signal comprises a visual-light photograph of the user or, a microphone and the passive identity signal comprises audio containing speech of the user.

13. The device of claim 8, wherein the first content comprises applications that are available to all users of the communal computing device.

14. The device of claim 8, wherein the second content comprises private data of the user.

15. The device of claim 8, wherein the second content includes content that is shared with a second user and the second content is included in the user interface in response to identifying the second user as proximate to the communal computing device.

16. At least one computer-readable storage medium having computer executable instructions stored thereon which, when executed by one or more processors, cause a communal computing device to:
 establish a trust relationship with a centrally-managed identity service;
 detect a presence of a user using one or more sensors and/or one or more wireless communication connections to collect passive identification signals;
 determine an identity of the user based on two or more of the passive identification signals;
 provide a first level of functionality to the user based on the identity of the user;
 detect a request to access a second level of functionality provided by the communal computing device;
 responsive to detection of the request, communicate with the centrally-managed identity service to cause an authentication request to be sent to a personal device associated with the user; receive an indication from the centrally-managed identity service that authentication of the
user was performed on the personal device; and
provide the second level of functionality to the user based on the authentication.

17. The at least one computer-readable storage medium of claim 16, wherein the first level of functionality is further based on information about the user received from the centrally-managed identity service.

18. The at least one computer-readable storage medium of claim 16, wherein the second level of functionality is further based on a confidence level in the authentication.

19. The at least one computer-readable storage medium of claim 16, wherein the second level of functionality includes the first level of functionality and additional functionality based on private data of the user.

20. The at least one computer-readable storage medium of claim 16, having further computer-executable instructions stored thereon which cause the communal computing device to:
 determine that the passive identification signals have not been detected for more than a threshold period of time; and
 remove access to the second level of functionality.

* * * * *